(12) United States Patent
Delattre et al.

(10) Patent No.: US 10,233,687 B2
(45) Date of Patent: Mar. 19, 2019

(54) HANDGUN MINI-VAULT

(71) Applicant: Hornady Manufacturing Company, Grand Island, NE (US)

(72) Inventors: Thomas Delattre, Stuart, FL (US); David Carson, Stuart, FL (US); Michael Romeo, Port St. Lucie, FL (US); Stephen Cunningham, Stuart, FL (US)

(73) Assignee: Hornady Manufacturing Company, Grand Island, NE (US)

( * ) Notice: Subject to any disclaimer, the term of this patent is extended or adjusted under 35 U.S.C. 154(b) by 127 days.

(21) Appl. No.: 15/333,927

(22) Filed: Oct. 25, 2016

(65) Prior Publication Data

US 2017/0046899 A1    Feb. 16, 2017

Related U.S. Application Data

(63) Continuation of application No. 14/174,527, filed on Feb. 6, 2014, now Pat. No. 9,530,266.

(60) Provisional application No. 61/761,610, filed on Feb. 6, 2013.

(51) Int. Cl.
| | |
|---|---|
| *F41C 33/06* | (2006.01) |
| *E05G 1/00* | (2006.01) |
| *G07C 9/00* | (2006.01) |
| *E05G 1/04* | (2006.01) |
| *G06K 7/10* | (2006.01) |

(52) U.S. Cl.
CPC ............. *E05G 1/005* (2013.01); *E05G 1/04* (2013.01); *F41C 33/06* (2013.01); *G06K 7/10366* (2013.01); *G07C 9/00912* (2013.01)

(58) Field of Classification Search
CPC .... E05G 1/00; E05G 1/02; E05G 1/04; E05G 1/005; G07C 9/00182; G07C 9/00912; G07C 2009/00206; G07C 2009/0096; G07C 2009/00984; F41C 33/00; F41C 33/02; F41C 33/06
See application file for complete search history.

(56) References Cited

U.S. PATENT DOCUMENTS

| | | |
|---|---|---|
| 1,240,981 A | 9/1917 | Kohl |
| 3,095,724 A | 7/1963 | Truhon |
| 3,354,570 A | 11/1967 | Rizzo, Jr. |
| 3,589,062 A | 6/1971 | Desmond et al. |
| 4,342,207 A | 8/1982 | Holmes et al. |
| 4,470,277 A | 9/1984 | Uyeda |
| 4,917,022 A | 4/1990 | Ogasawara et al. |
| 4,964,286 A | 10/1990 | Poyer |
| 5,010,751 A | 4/1991 | Schwartz et al. |

(Continued)

*Primary Examiner* — Christopher J Boswell
(74) *Attorney, Agent, or Firm* — McHale & Slavin, P.A.

(57) ABSTRACT

The present invention provides a system and method for firearm storage; and more particularly, a safe and secure handgun mini-vault apparatus for a loaded handgun that allows an authorized user rapid, unobstructed and effortless access to the handgun. The handgun mini-vault system of the present invention not only provides for relative ease of assembly and aesthetically appealing appearance, it also permits access to the handgun without the need to manually manipulate a locking device. The locking system of the present invention utilizes RFID technology to allow authorized users to open the mini-vault by simply waiving an RFID chip in proximity to the mini-vault interrogator.

16 Claims, 54 Drawing Sheets

(56) References Cited

U.S. PATENT DOCUMENTS

| | | |
|---|---|---|
| 5,056,342 A | 10/1991 | Prinz |
| 5,060,583 A | 10/1991 | Stinson |
| 5,111,199 A | 5/1992 | Tomoda et al. |
| 5,170,919 A | 12/1992 | DeSantis et al. |
| 5,236,086 A * | 8/1993 | MacTaggart ............ F41C 33/06 206/317 |
| 5,280,755 A | 1/1994 | Batur |
| 5,294,031 A | 3/1994 | Volpei et al. |
| 5,374,919 A | 12/1994 | Zelka et al. |
| 5,495,967 A | 3/1996 | Parton |
| 5,579,909 A | 12/1996 | Deal |
| 5,584,424 A | 12/1996 | Stava |
| 5,632,166 A | 5/1997 | Wiersma |
| 5,662,219 A | 9/1997 | Tschudy et al. |
| 5,671,830 A | 9/1997 | Wood |
| 5,687,896 A | 11/1997 | Clift |
| 5,881,584 A | 3/1999 | Brunoski et al. |
| 5,924,565 A | 7/1999 | Colee |
| 5,943,888 A | 8/1999 | Lawson |
| 5,967,393 A | 10/1999 | Clarke, III |
| 6,209,250 B1 | 4/2001 | Mills |
| 6,279,359 B1 | 8/2001 | Boisvert |
| 6,293,207 B1 | 9/2001 | Do |
| 6,318,134 B1 | 11/2001 | Mossberg et al. |
| 6,405,861 B1 | 6/2002 | Siler et al. |
| 6,570,501 B2 | 5/2003 | Bushnell et al. |
| 6,606,492 B1 | 8/2003 | Losey |
| 6,843,081 B1 | 1/2005 | Painter |
| 6,876,756 B1 | 4/2005 | Vieweg |
| 7,143,913 B2 | 12/2006 | Lindsey et al. |
| 7,296,448 B1 | 11/2007 | Shaw |
| 7,434,427 B1 | 10/2008 | Miresmaili |
| 7,469,564 B1 | 12/2008 | Shaw |
| 7,537,117 B2 | 5/2009 | Roesler |
| 7,845,202 B2 | 12/2010 | Padilla et al. |
| 8,074,477 B1 | 12/2011 | Weiche |
| 8,104,313 B2 | 1/2012 | Wolfe |
| 8,157,181 B2 | 4/2012 | Bates et al. |
| 8,201,426 B2 | 6/2012 | Heim et al. |
| 8,826,704 B1 | 9/2014 | Marshall |
| 9,428,114 B2 * | 8/2016 | Mothersele ............... B60R 7/00 |
| 9,530,266 B2 * | 12/2016 | Delattre .................. E05G 1/005 |
| 9,534,867 B2 * | 1/2017 | Dunn ...................... F41C 33/06 |
| 2001/0010491 A1 | 8/2001 | Marneweck et al. |
| 2003/0001724 A1 | 1/2003 | Willats et al. |
| 2003/0167693 A1 | 9/2003 | Mainini |
| 2003/0217574 A1 | 11/2003 | Meis |
| 2005/0235711 A1 | 10/2005 | Martin et al. |
| 2006/0213239 A1 | 9/2006 | Roatis et al. |
| 2006/0283219 A1 | 12/2006 | Bendz et al. |
| 2007/0000965 A1 | 1/2007 | Cannon, Jr. |
| 2007/0018787 A1 | 1/2007 | Martinez de Velasco Cortina et al. |
| 2007/0257772 A1 | 11/2007 | Marcelle et al. |
| 2008/0047860 A1 | 2/2008 | Shane |
| 2008/0180211 A1 | 7/2008 | Lien |
| 2008/0256998 A1 | 10/2008 | Mallian et al. |
| 2008/0264309 A1 | 10/2008 | Villiger |
| 2009/0308116 A1 | 12/2009 | Lambrou |
| 2010/0025446 A1 | 2/2010 | Eberle |
| 2010/0171589 A1 | 7/2010 | Haberli |
| 2010/0194527 A1 | 8/2010 | Loughlin et al. |
| 2010/0236298 A1 | 9/2010 | James et al. |
| 2010/0243492 A1 | 9/2010 | Bulthuis, Jr. et al. |
| 2011/0162564 A1 | 7/2011 | Heim et al. |
| 2011/0174200 A1 | 7/2011 | Bartel |
| 2011/0247950 A1 | 10/2011 | McGee |
| 2011/0290837 A1 | 12/2011 | Smith |
| 2012/0152776 A1 | 6/2012 | Camp |
| 2012/0324968 A1 | 12/2012 | Goren et al. |
| 2013/0025511 A1 | 1/2013 | Maxwell |
| 2013/0055933 A1 | 3/2013 | Markman et al. |
| 2013/0133558 A1 | 5/2013 | Andrews |
| 2013/0134193 A1 | 5/2013 | Mothersele |
| 2013/0298616 A1 | 11/2013 | Ullrich et al. |
| 2014/0083338 A1 | 3/2014 | McAlexander |
| 2014/0116303 A1 | 5/2014 | Mothersele |
| 2014/0145819 A1 | 5/2014 | Wall et al. |
| 2014/0182489 A1 | 7/2014 | Suggs et al. |

* cited by examiner

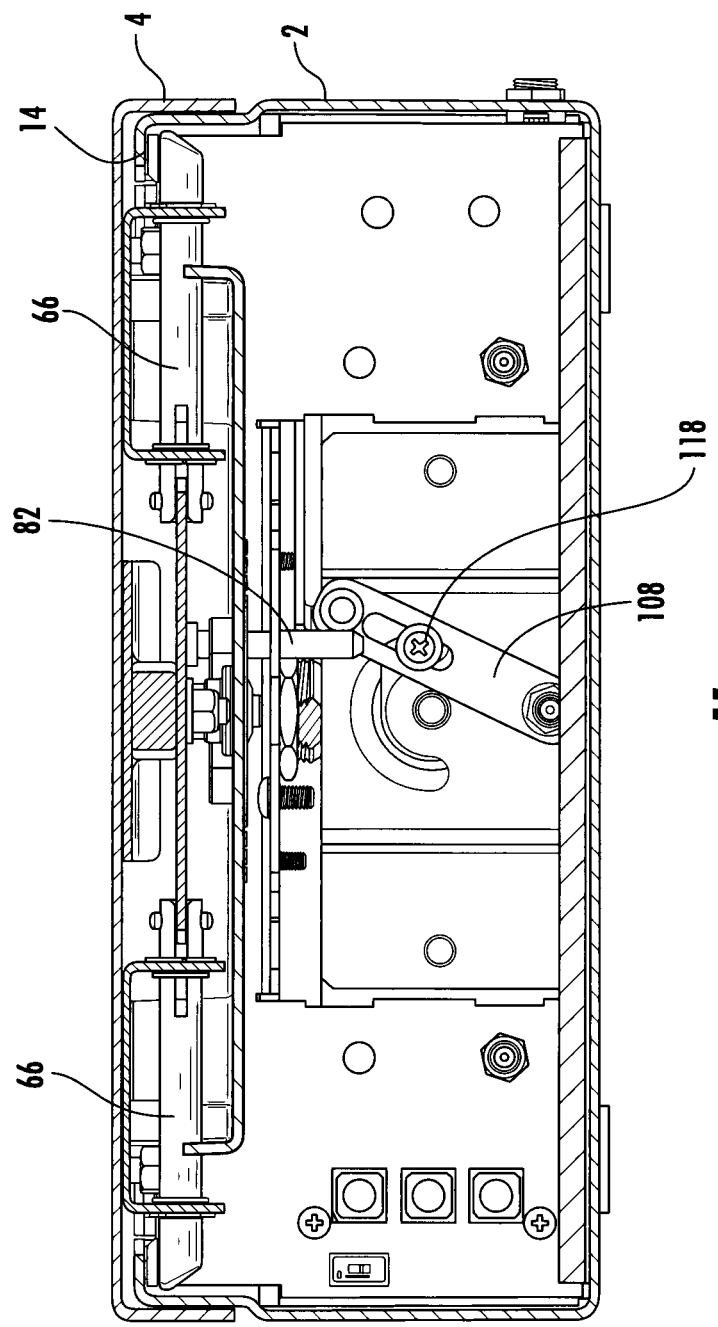

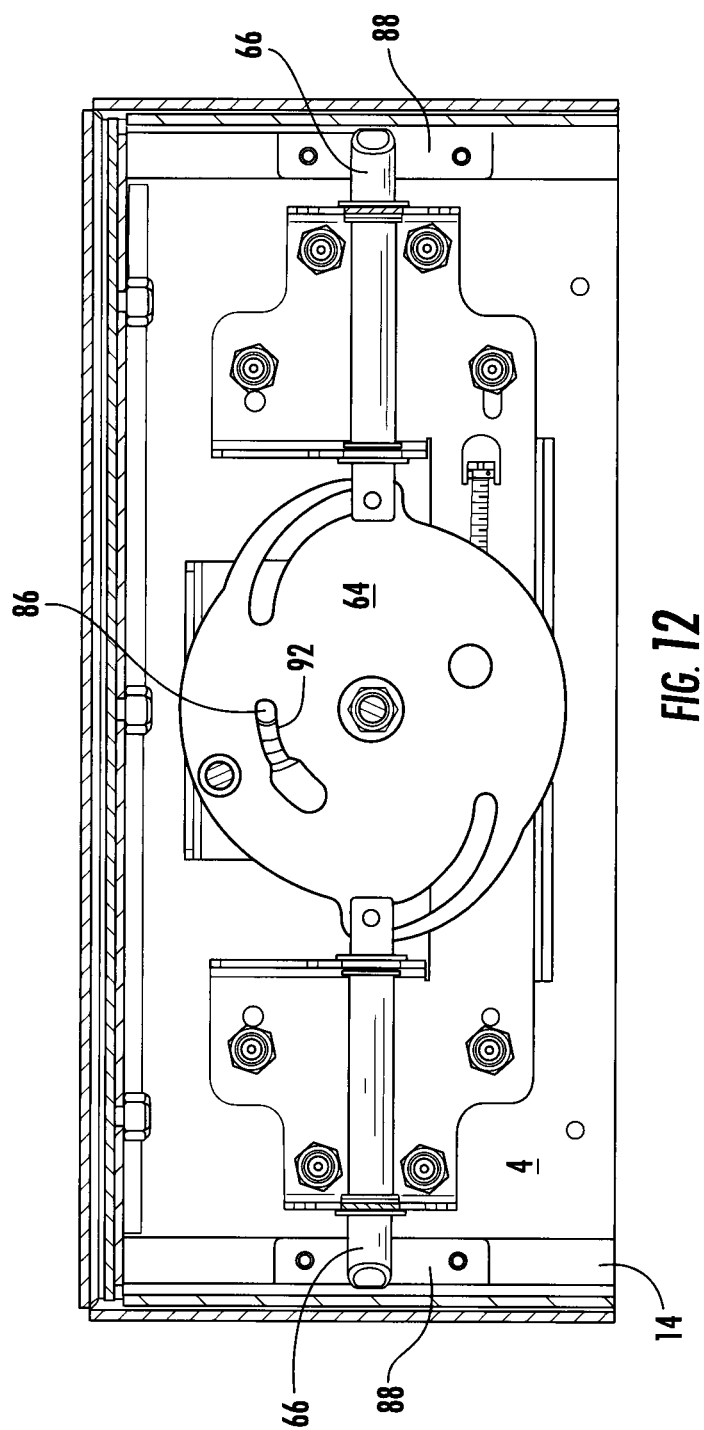

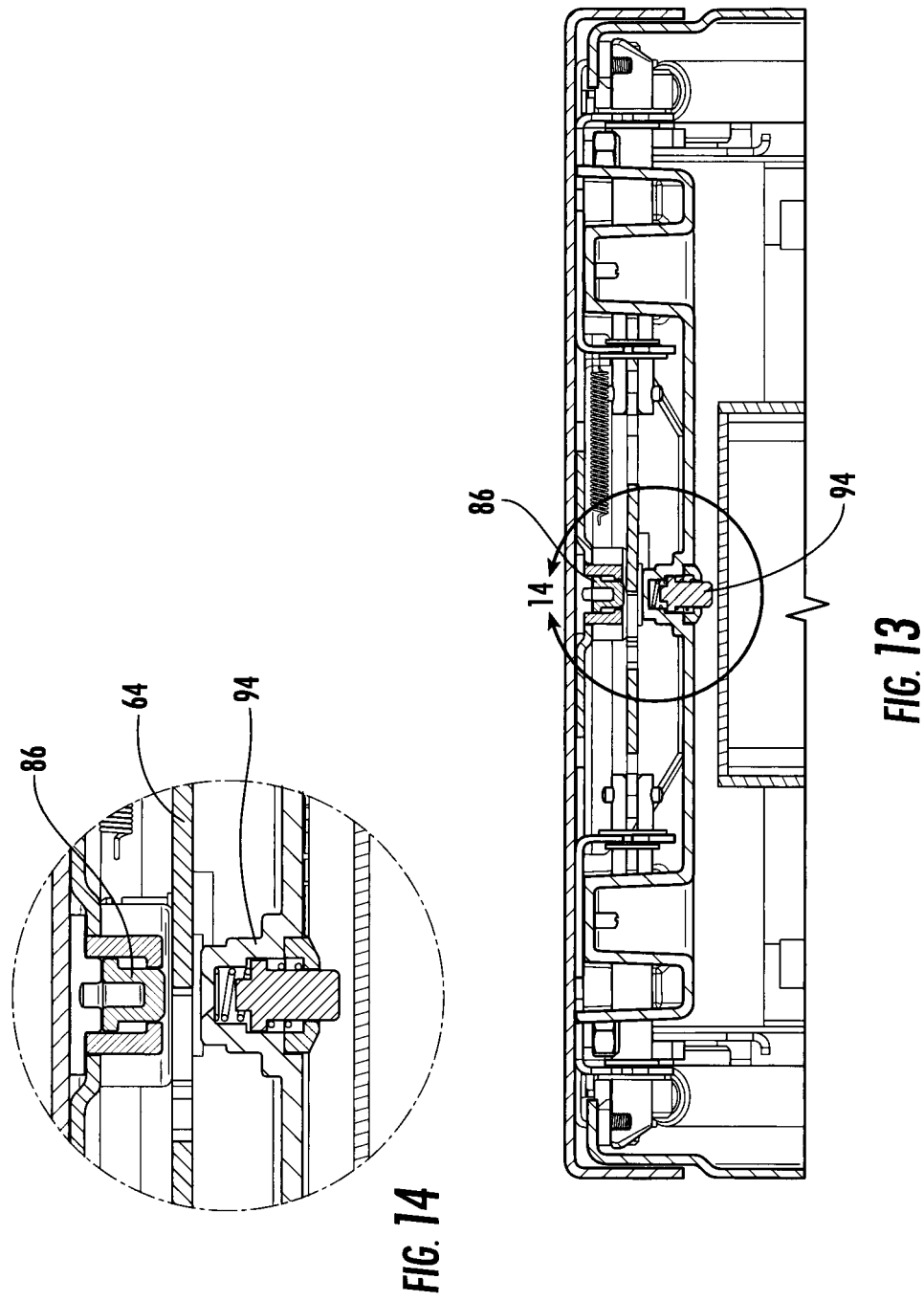

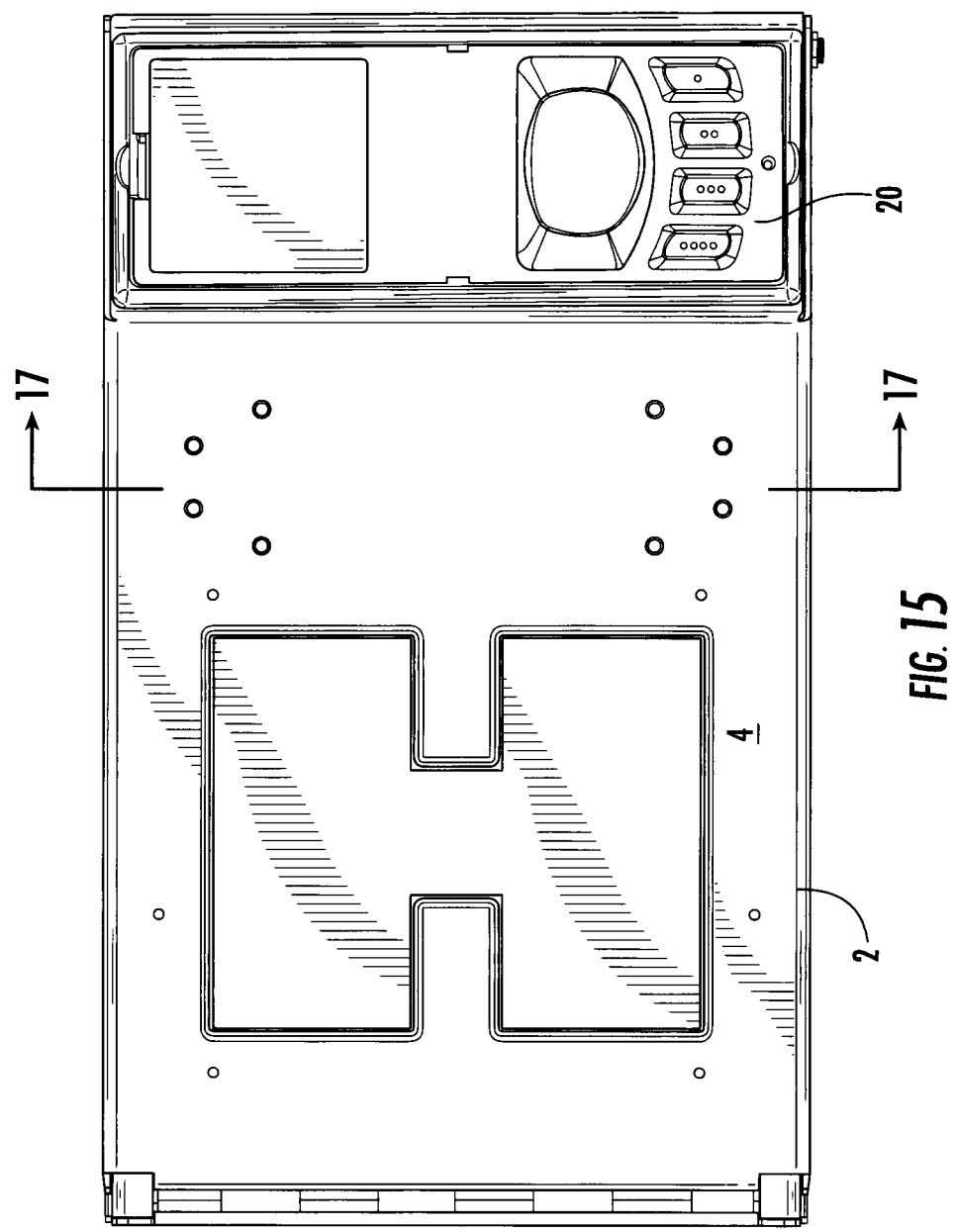

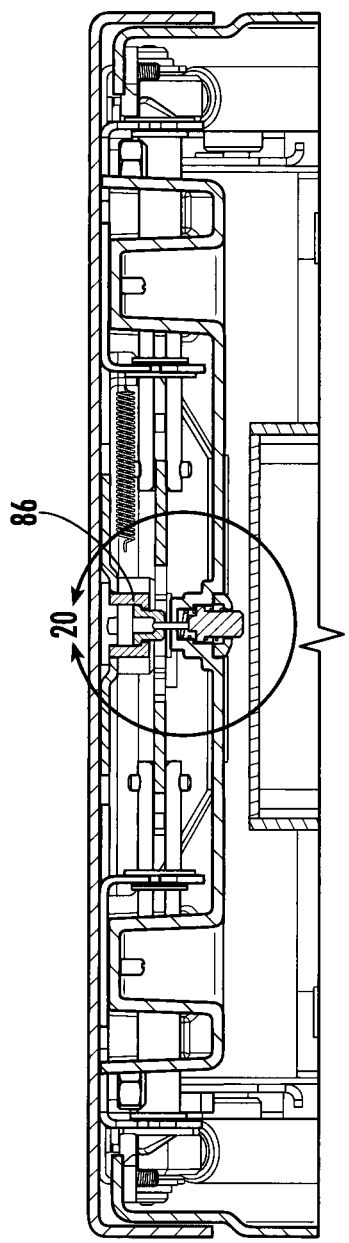
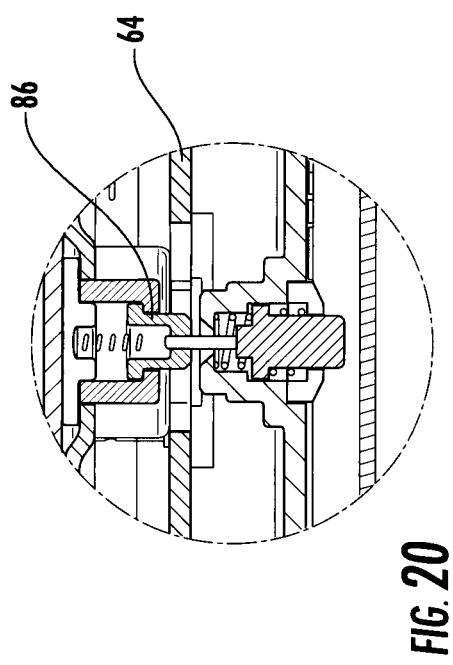
FIG. 19
FIG. 20

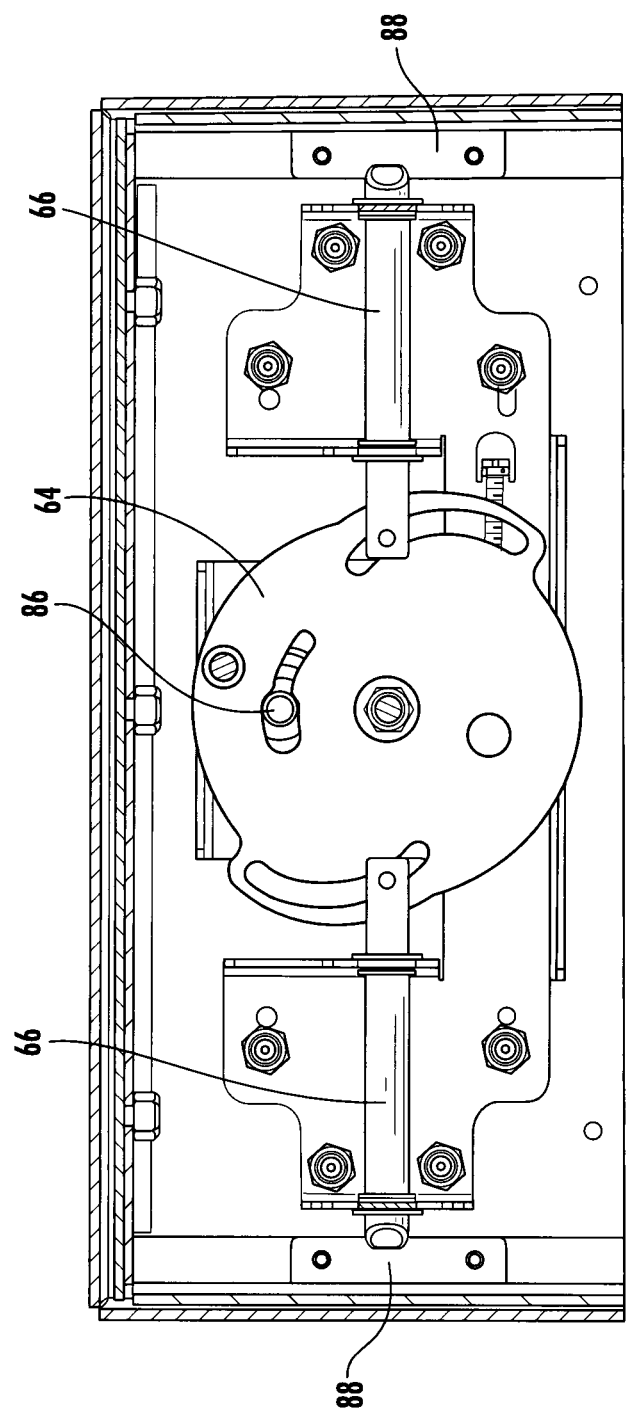

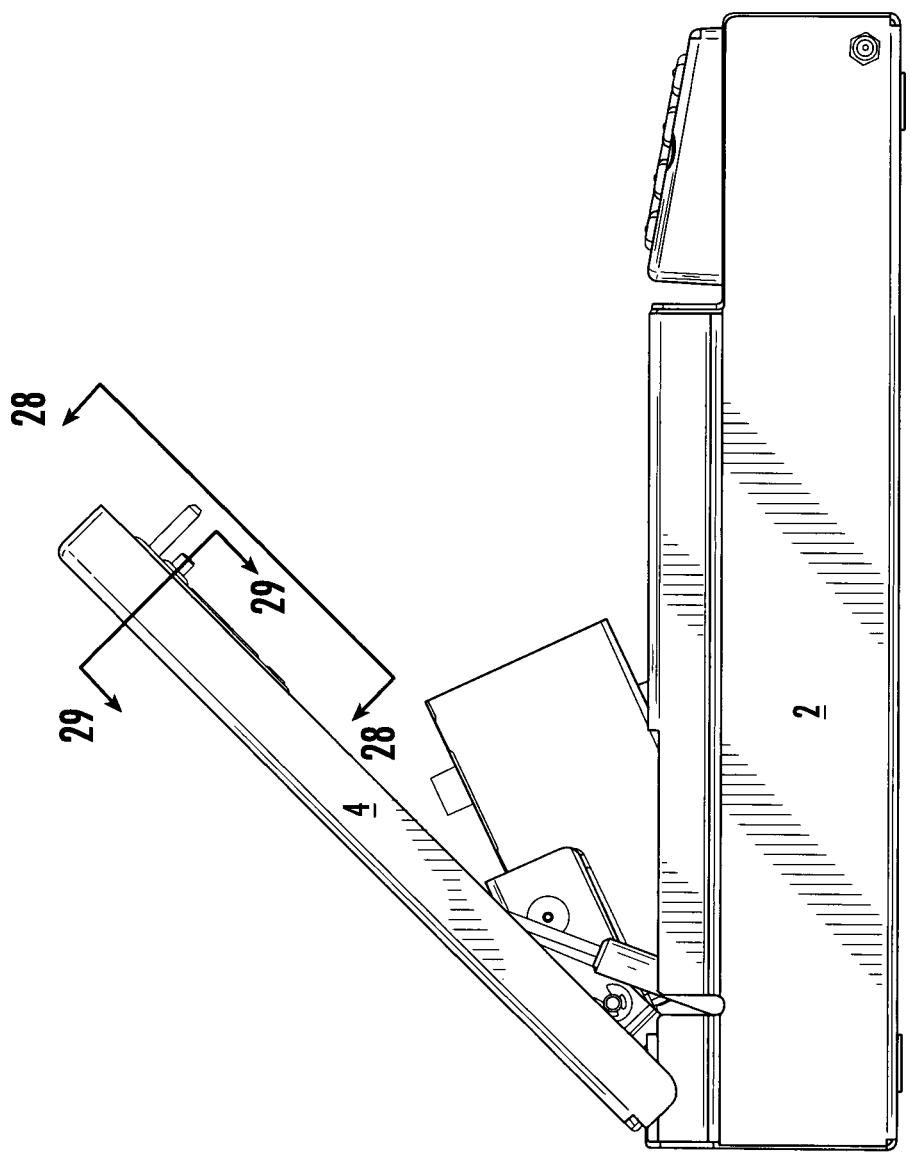

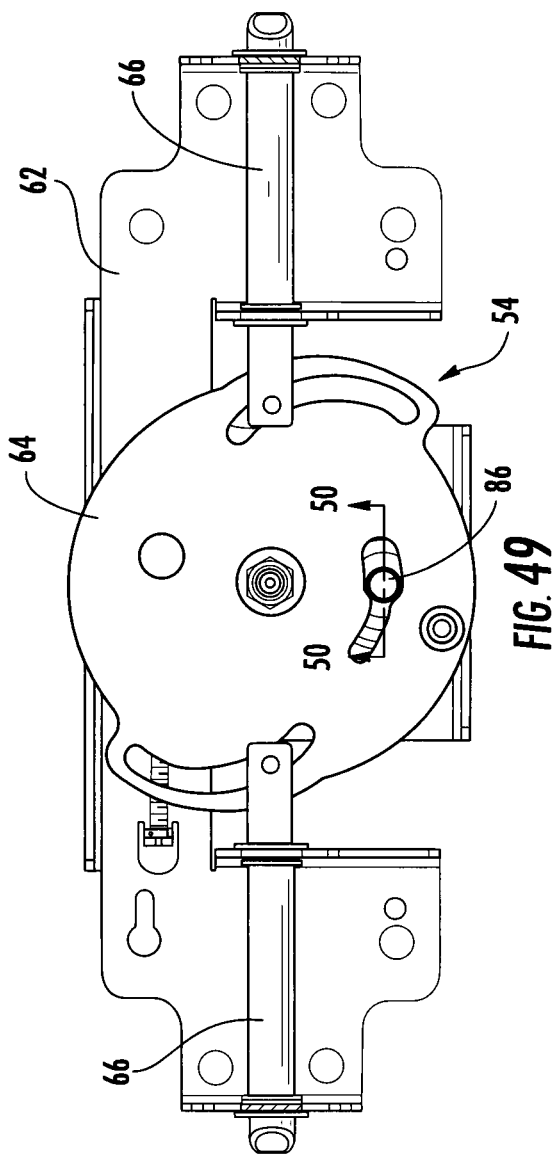
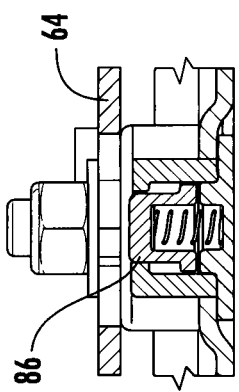
FIG. 49
FIG. 50

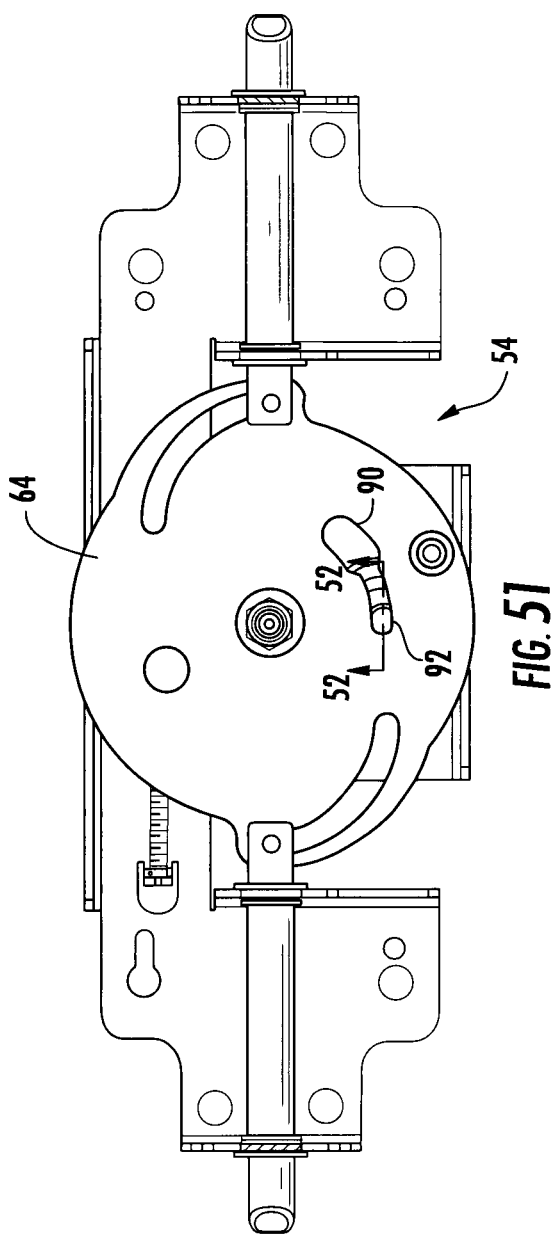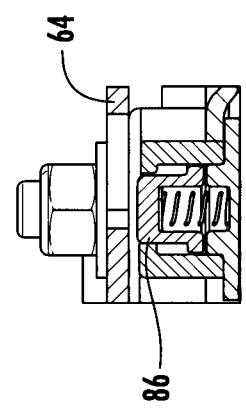
FIG. 51
FIG. 52

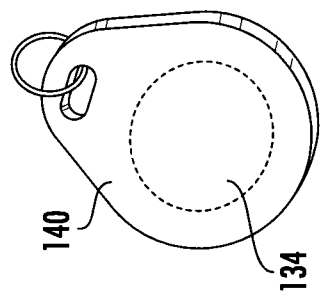
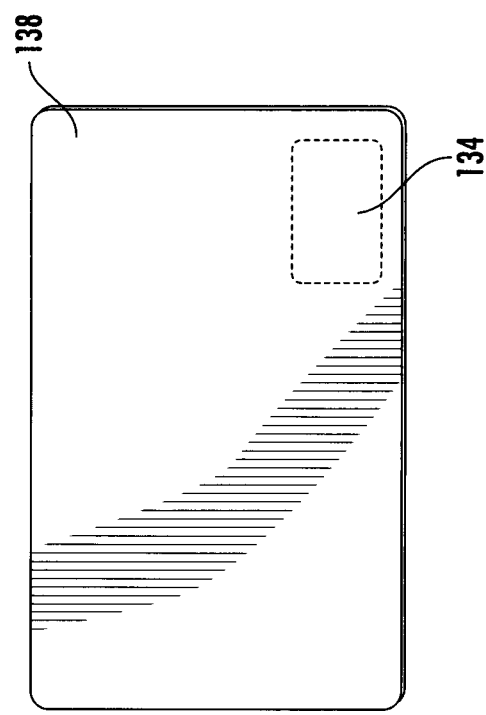

HANDGUN MINI-VAULT

RELATED APPLICATIONS

In accordance with 37 C.F.R 1.76, a claim of priority is included in an Application Data Sheet filed concurrently herewith. Accordingly, the present application claims priority as a continuation of U.S. patent application Ser. No. 14/174,527, filed Feb. 6, 2014, entitled "Handgun Mini-Vault", which claims priority to U.S. Provisional Patent Application No. 61/761,610, filed Feb. 6, 2013, entitled, "Handgun Mini-Vault", the contents of the above referenced applications are herein incorporated by reference in their entirety.

FIELD OF INVENTION

The present invention generally relates to firearm storage, and more particularly to a safe and secure handgun mini-vault apparatus for a loaded handgun that allows an authorized user rapid, unobstructed and effortless access to the handgun.

BACKGROUND INFORMATION

Firearm safety is a paramount concern among firearm owners and gun enthusiasts. As a result of this concern, there is a plethora of gun safes on the market, many equipped with high technology locking devices, which range from numerical codes to biometric recognition. Firearm owners largely fall into one of two categories with a substantial overlap between the two categories. In the first category, firearm owners are interested in the firearm from a functional/aesthetic perspective. In the second category, the firearm owners are interested in the firearm as a protection tool for protecting their domiciles. Firearm safes on the market today are designed to lock away firearms from theft and accidental discharge. For example, a safe can easily weigh several hundred pounds, making the safe immovable for a thief. At the same time, safes with electronic code entry panels or mechanical safe combinations make the contents of the safe essentially unreachable for a common thief.

However, a firearm owner who obtained the firearm for the purpose of protecting his/her domicile would need to reach the firearm quickly and safely. For example, in the middle of a night, upon hearing an intruder approaching a bedroom, the owner may not have time to get out of bed, approach the safe which may be in another room, key in the combination in the dark, open the safe, retrieve the firearm and point it in the direction of the intruder. However, placing the firearm in a drawer near the bed would not provide the safety that would be required by the owner against accidental or unauthorized use of the firearm, e.g., by a minor or thief.

Therefore, what is needed is a mechanism that allows a firearm owner quick and safe access to his/her firearm, while the firearm is otherwise locked away from unauthorized use. The access mechanism should be operable by a keyed device, such as an RFID which may be placed into a ring, bracelet, key fob, credit card or the like, and may even be implanted into the body of the person who is allowed access to the firearm. Thus, the present invention provides a handgun mini-vault which overcomes the disadvantages of prior art handgun safe systems.

SUMMARY OF THE INVENTION

Briefly, the present invention provides a system and method for firearm storage; and more particularly, a safe and secure handgun mini-vault apparatus for a loaded handgun that allows an authorized user rapid, unobstructed and effortless access to the handgun. The handgun mini-vault system of the present invention not only provides for relative ease of assembly and aesthetically appealing appearance, it also permits access to the handgun without the need to manually manipulate a locking device. The locking system of the present invention utilizes RFID technology to allow authorized users to open the mini-vault by simply waiving an RFID chip in proximity to the mini-vault interrogator. The RFID chip is preferably embedded into a wrist band or the like; however, the RFID chip may be embedded into a key fob, ring, credit card or the like without departing from the scope of the invention. The present invention also provides an automatically opening door system, which places the handgun in a position suitable for grasping in an operable position, thereby eliminating the need for manipulating the handgun to ready it for operation. The mini-vault preferably utilizes an internal electrical source such as batteries to provide portability to the device; however, standard electrical current may be utilized without departing from the scope of the invention. The device also includes a power switch that activates the interrogator for the RFID for a predetermined amount of time to conserve battery power.

Accordingly, it is an objective of the present invention to provide a handgun mini-vault.

It is a further objective of the present invention to provide a handgun mini-vault that may be secured to a surface in close proximity to the bed of a user.

It is yet a further objective of the present invention to provide a handgun mini-vault that utilizes RFID technology to provide access to the interior of the mini-vault.

It is another objective of the instant invention to provide a handgun mini-vault that places the handgun in a ready position for operation upon opening of the vault door.

Other objectives and advantages of this invention will become apparent from the following description taken in conjunction with the accompanying drawings wherein are set forth, by way of illustration and example, certain embodiments of this invention. The drawings constitute a part of this specification, and include exemplary embodiments of the present invention and illustrate various objects and features thereof.

BRIEF DESCRIPTION OF THE FIGURES

FIG. 11 is a section view taken along lines 11-11 of FIG. 9;

FIG. 12 is a section view taken along lines 12-12 of FIG. 10;

FIG. 13 is a section view taken along lines 13-13 of FIG. 10;

FIG. 14 is a section view taken along lines 14-14 of FIG. 13;

FIG. 15 is a top view of the embodiment illustrated in FIG. 1;

FIG. 19 is a section view taken along lines 19-19 of FIG. 16;

FIG. 20 is a section view taken along lines 20-20 of FIG. 19;

FIG. 24 is a section view taken along lines 24-24 of FIG. 22;

FIG. 27 is a left side view of one embodiment of the mini-vault, illustrated with the door assembly in an open position;

FIG. 49 is a bottom view of the latch assembly, illustrated in an initial interlock position;

FIG. 50 is a section view taken along lines 50-50 of FIG. 49;

FIG. 51 is a bottom view of the latch assembly, illustrated in an extended or locked position;

FIG. 52 is a section view taken along lines 52-52 of FIG. 51;

FIG. 61 illustrates an RFID chip embedded into a key fob; and

FIG. 62 illustrates an RFID chip embedded into accredit card.

DETAILED DESCRIPTION OF THE PREFERRED EMBODIMENTS

Figure 1:
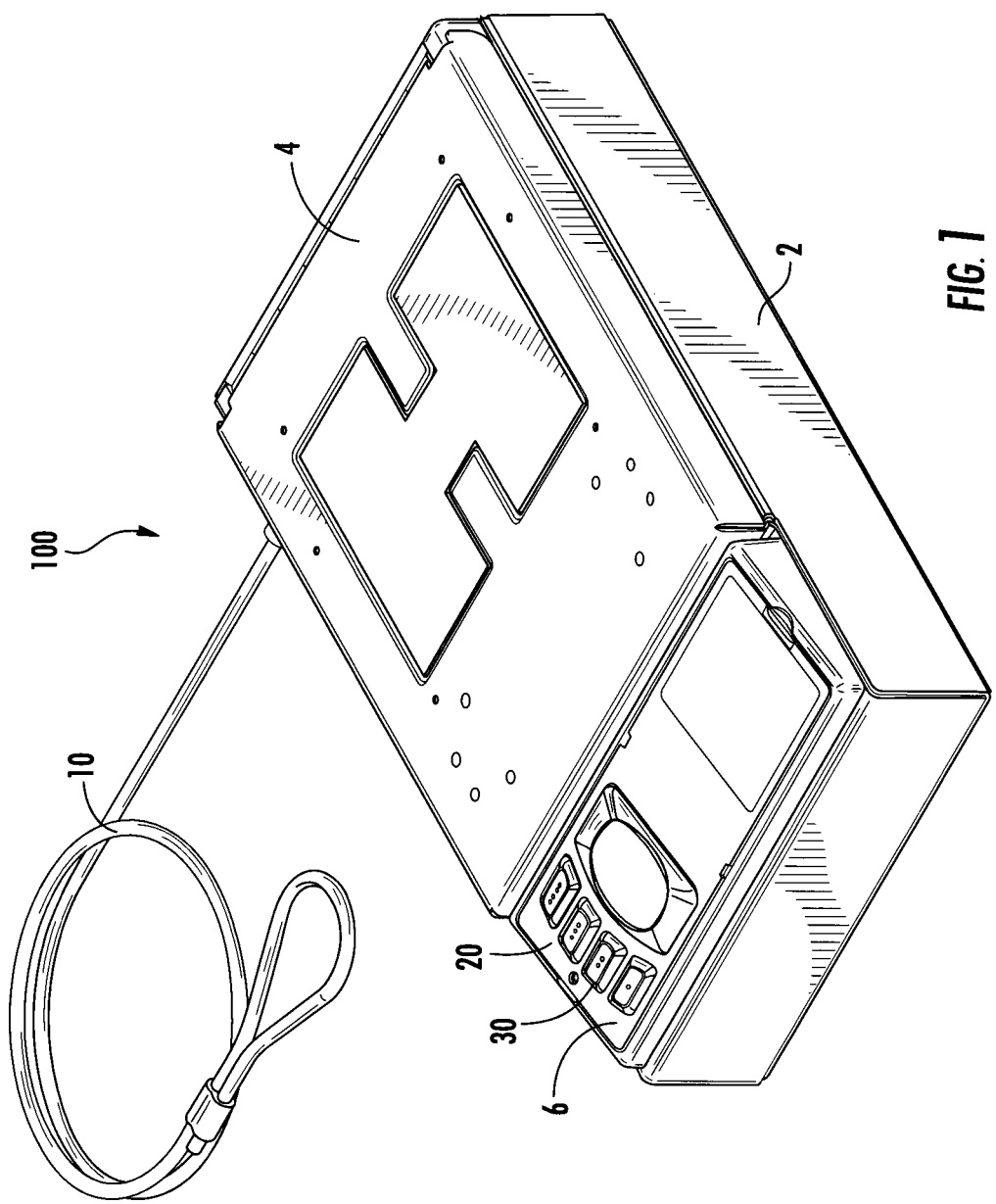
FIG. 1 is a top right perspective view of one embodiment of the present invention, illustrated with a cable tie for securing the mini-vault to an object.
Figure 2:
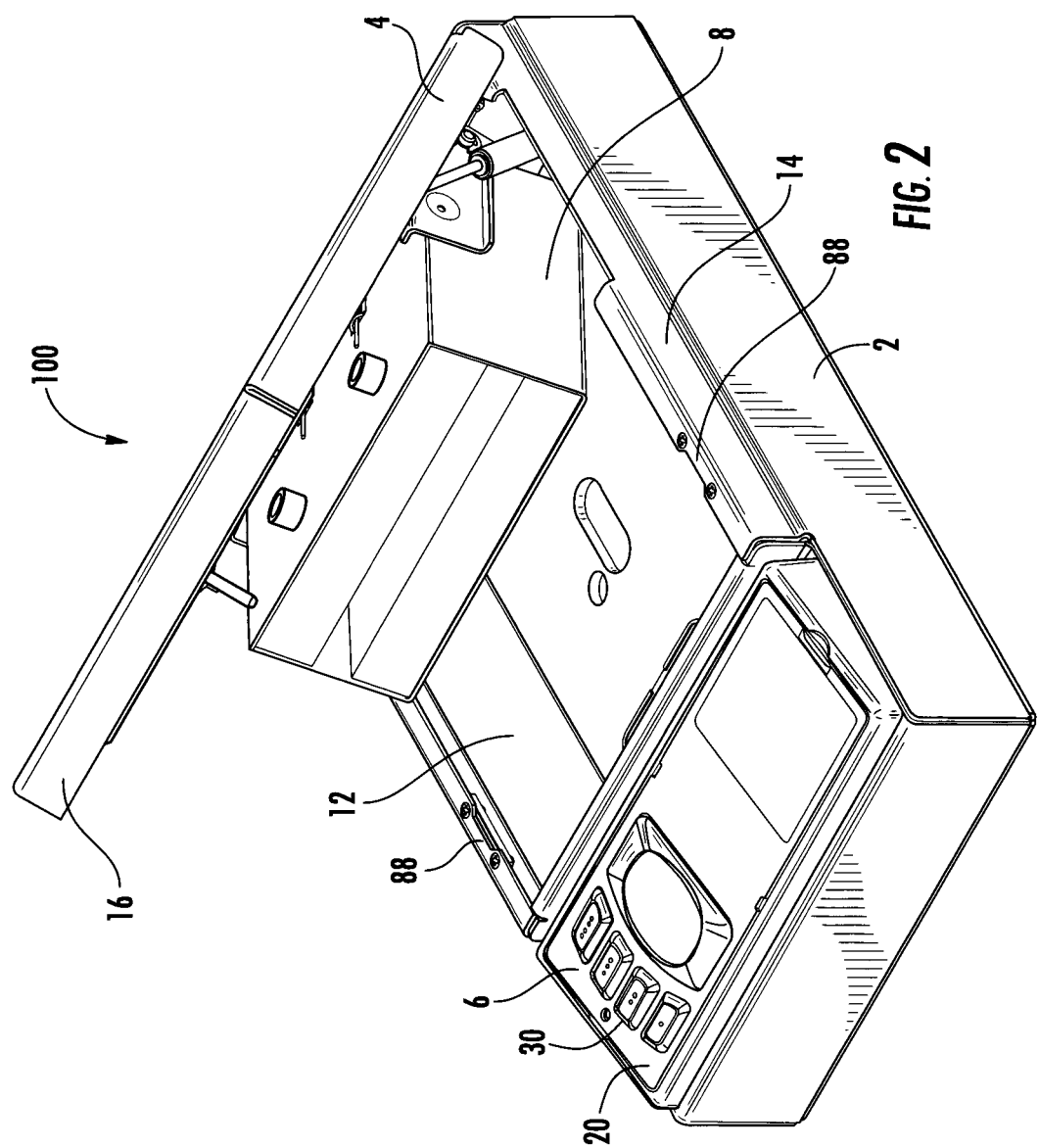
FIG. 2 is a top right perspective view of the embodiment shown in FIG. 1 illustrated with the mini-vault door in an open position.
Figure 3:
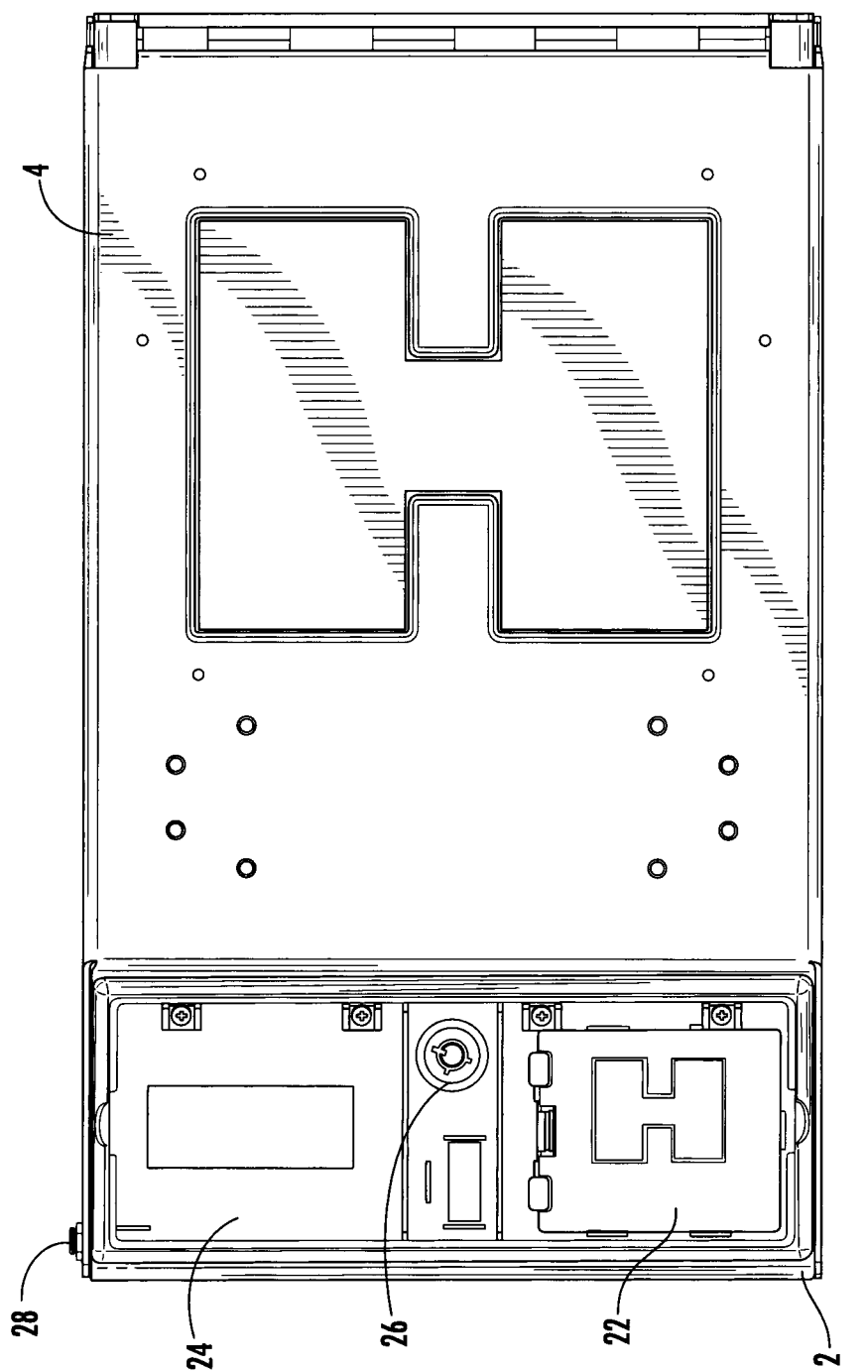
FIG. 3 is a top view of the embodiment shown in FIG. 1, illustrated with the button panel of the identification assembly removed.
Figure 4:
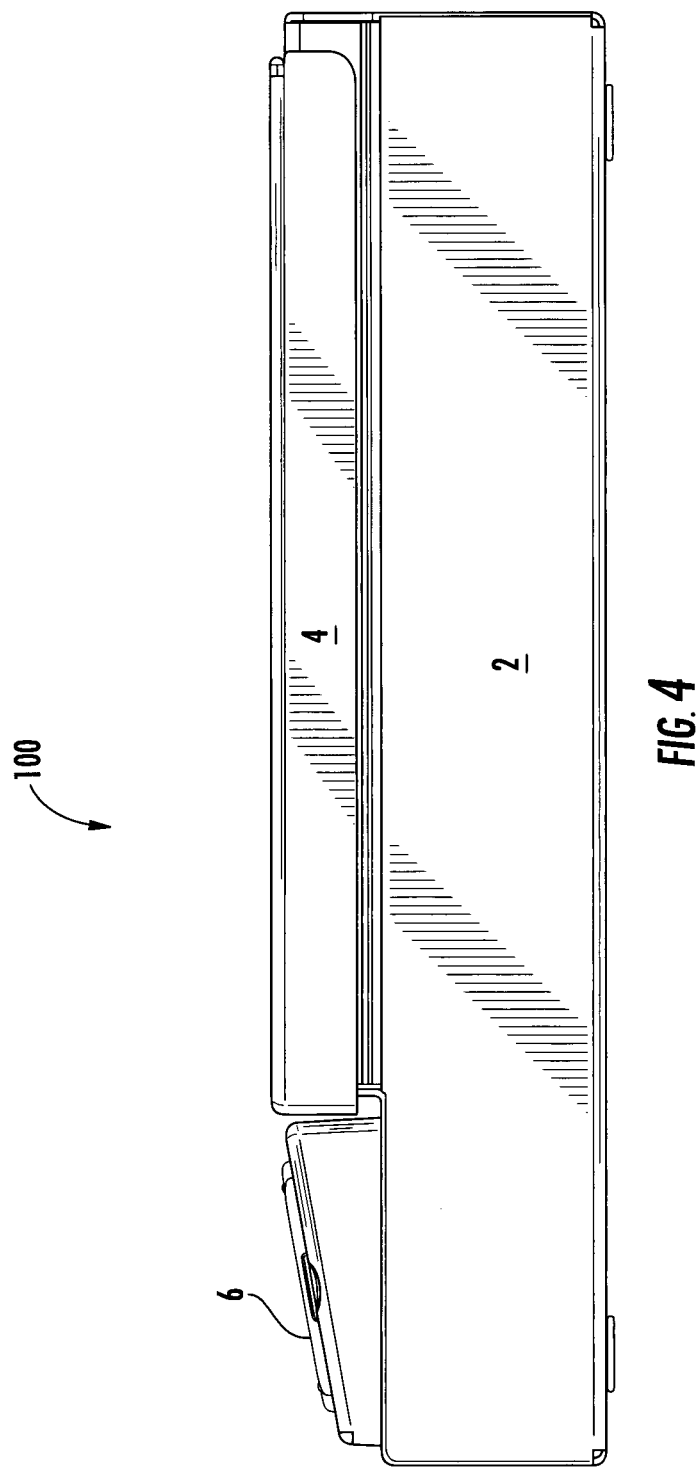
FIG. 4 is a right side view of one embodiment of the present invention.
Figure 5:
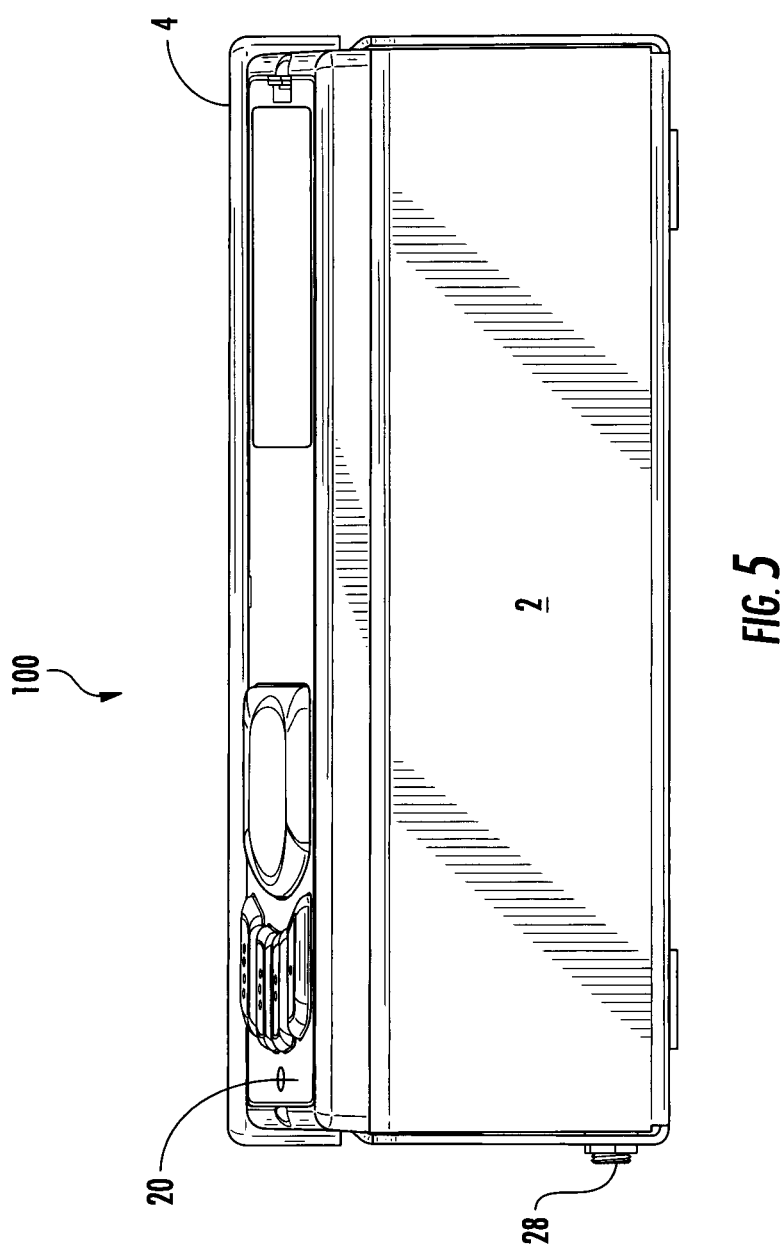
FIG. 5 is a front view of one embodiment of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring generally to FIGS. 1-61, the present invention provides a system and method for firearm storage, and more particularly a safe and secure handgun mini-vault apparatus for a loaded handgun. The mini-vault 100 includes a box assembly 2, a door assembly 4, an identification assembly 6, a weapon cartridge 8, and an optional securing cable 10.

Figure 33:
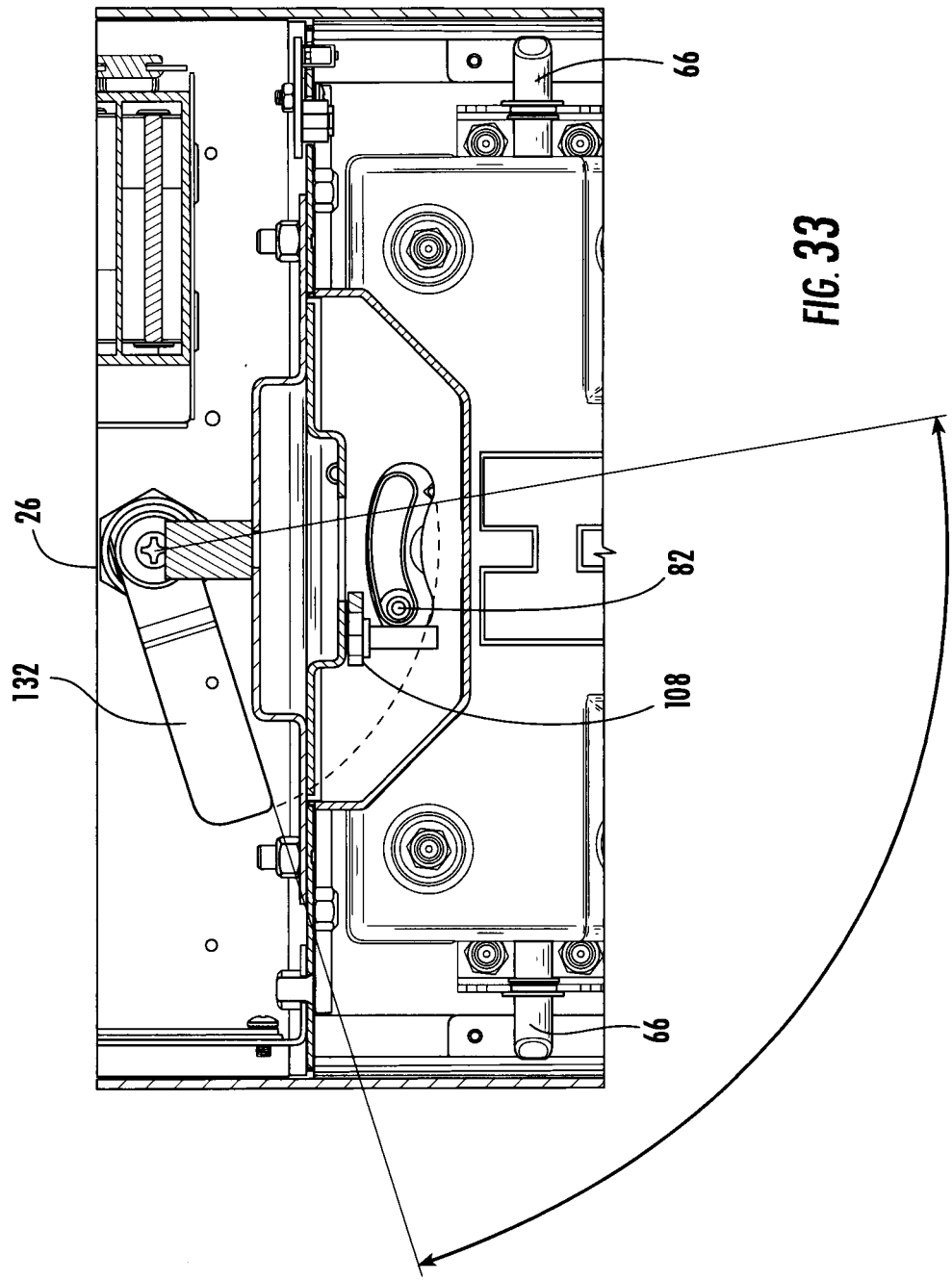
FIG. 33 is a section view taken along lines 33-33 of FIG. 32.
Figure 34:
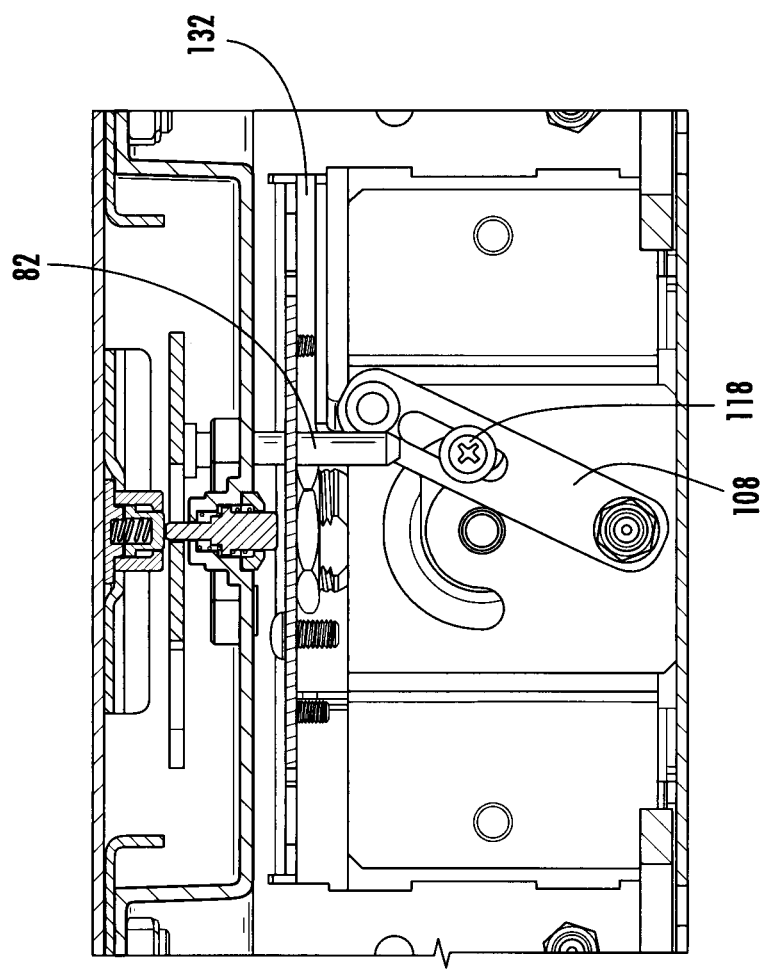
FIG. 34 is a section view taken along lines 34-34 of FIG. 31.
Figure 35:
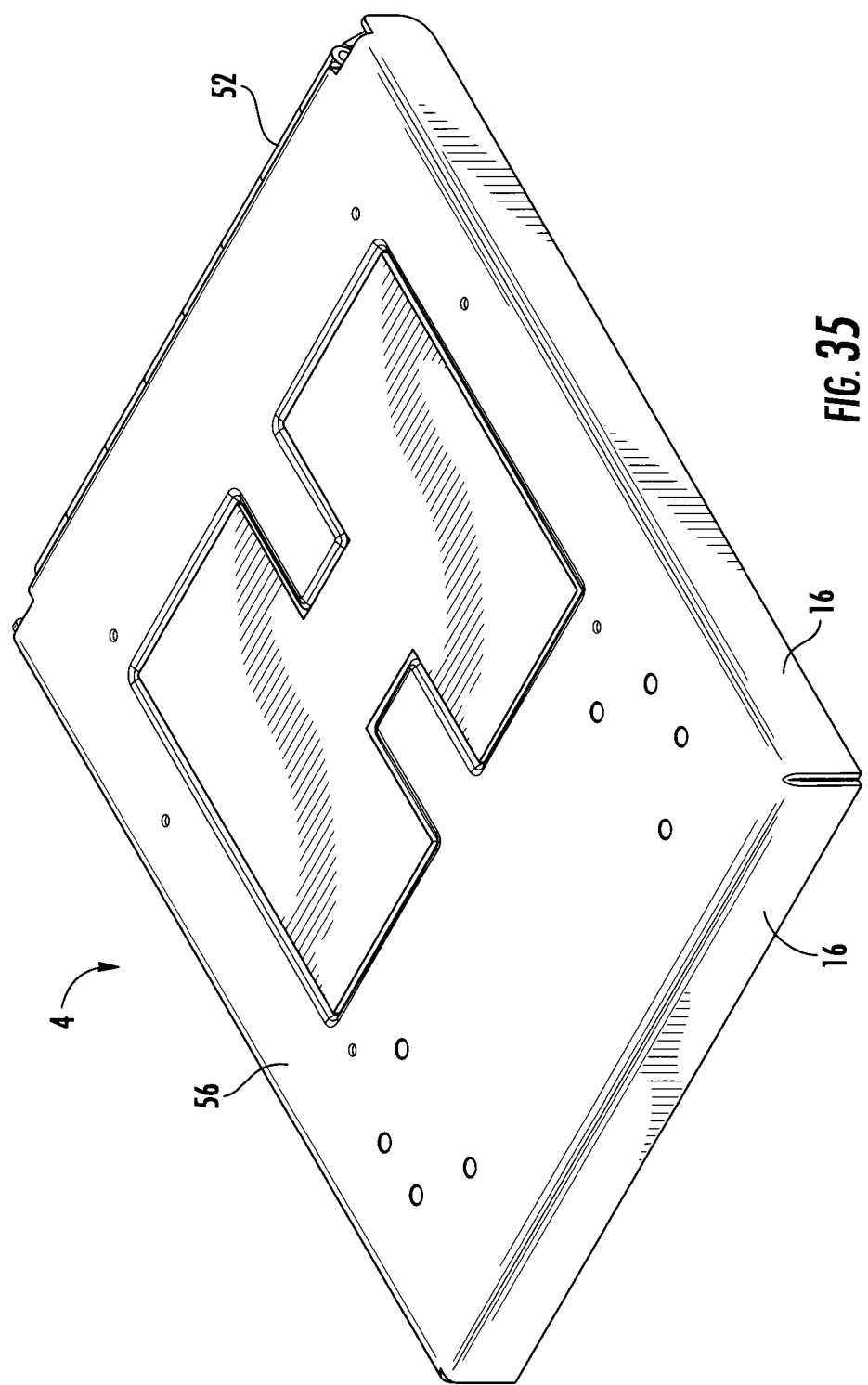
FIG. 35 is a top right perspective view of one embodiment of the door assembly of the present invention.
Figure 36:
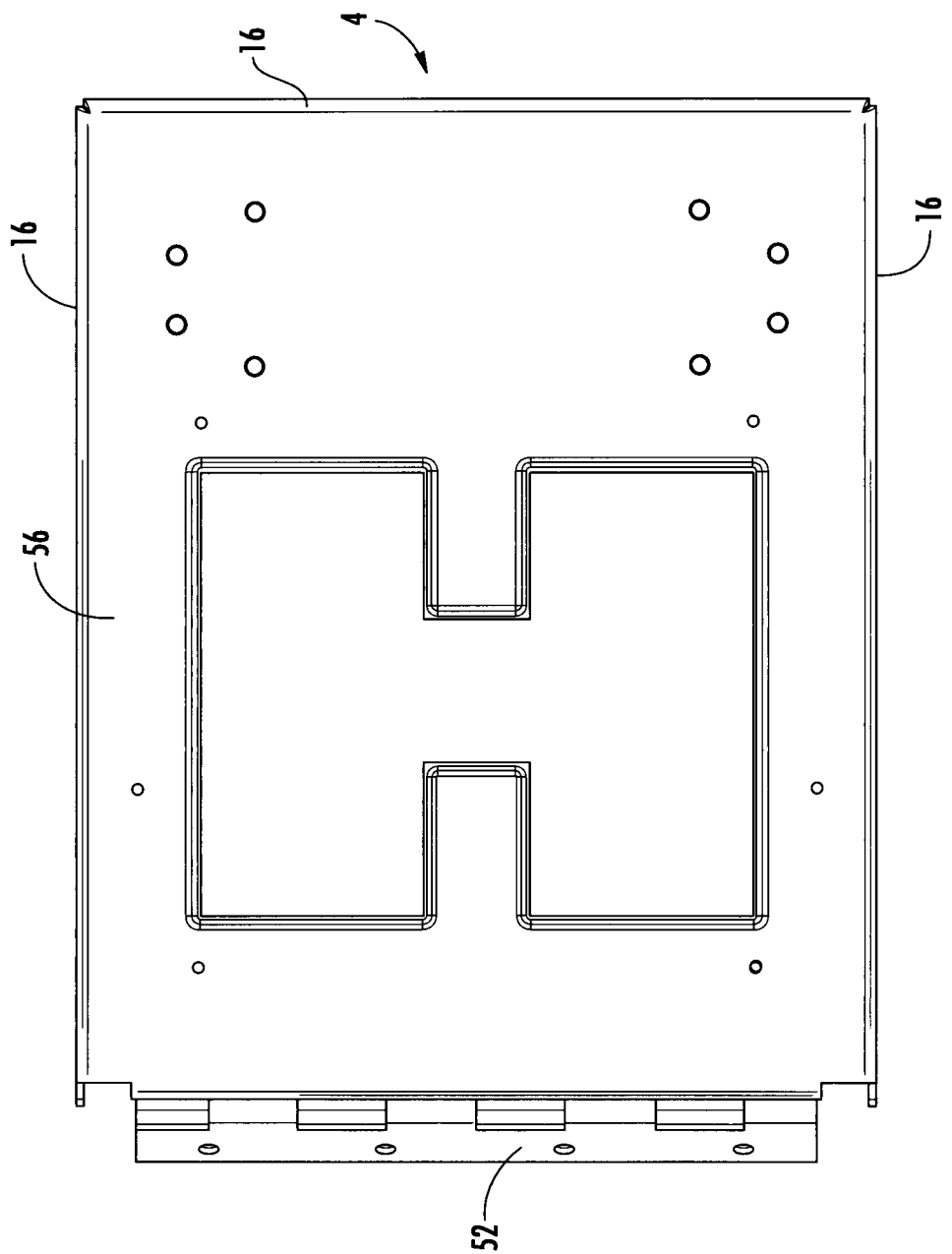
FIG. 36 is a top view of the door assembly illustrated in FIG. 35.
Figure 37:
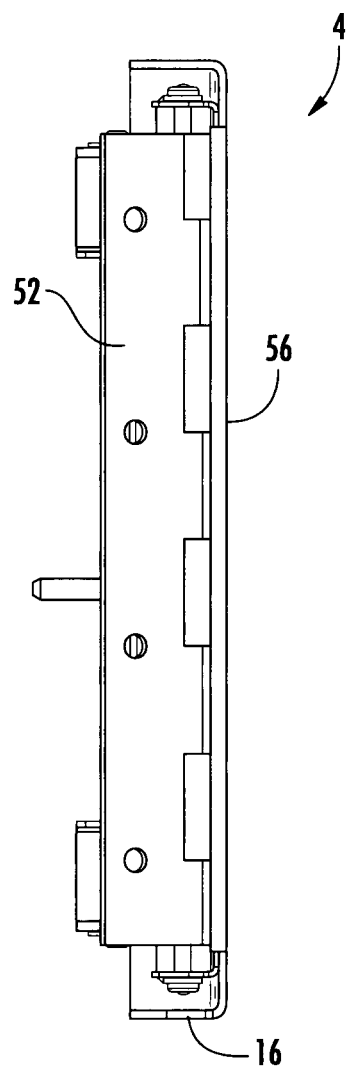
FIG. 37 is a rear view of the door assembly illustrated in FIG. 35.
Figure 38:
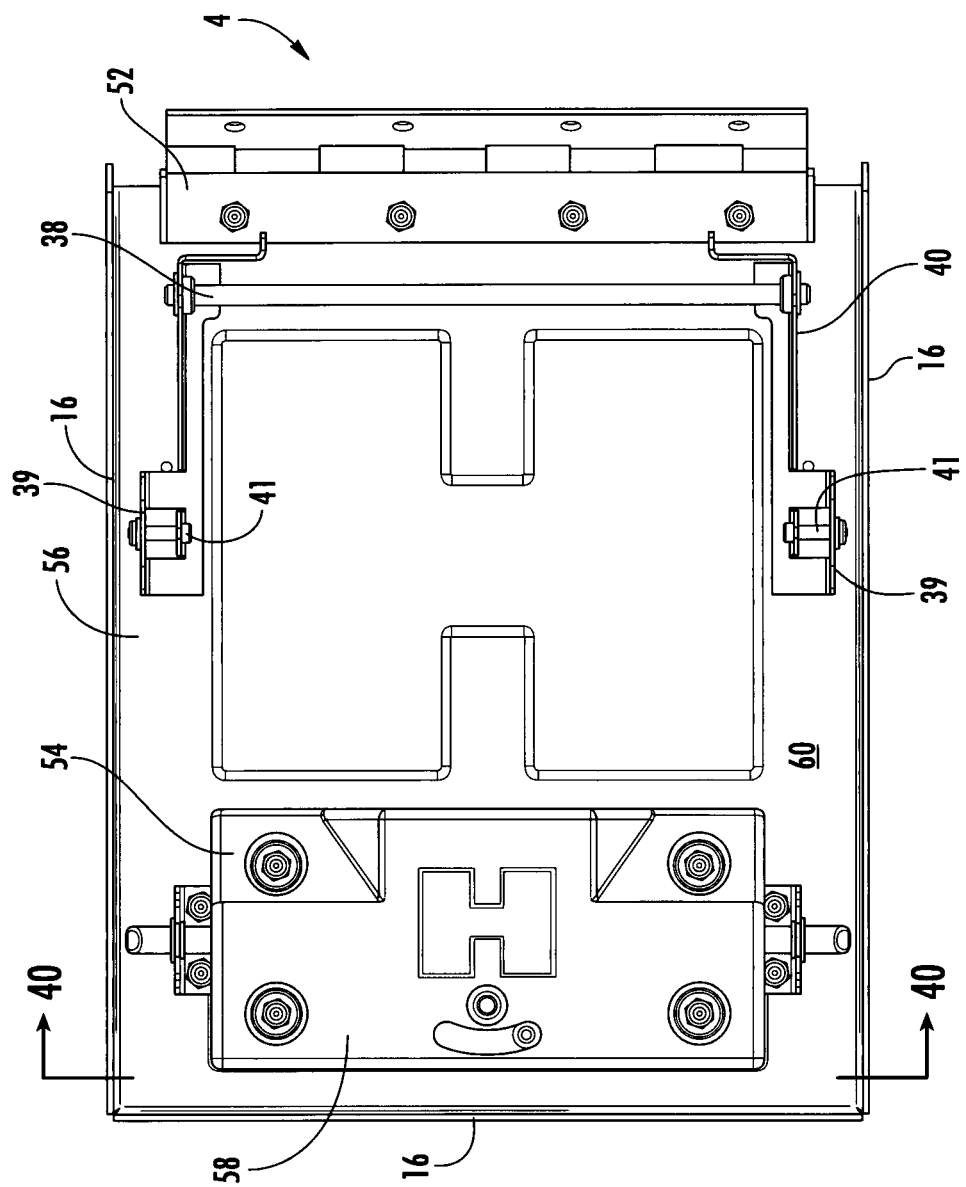
FIG. 38 is a bottom view of the door assembly illustrated in FIG. 35.
Figure 39:
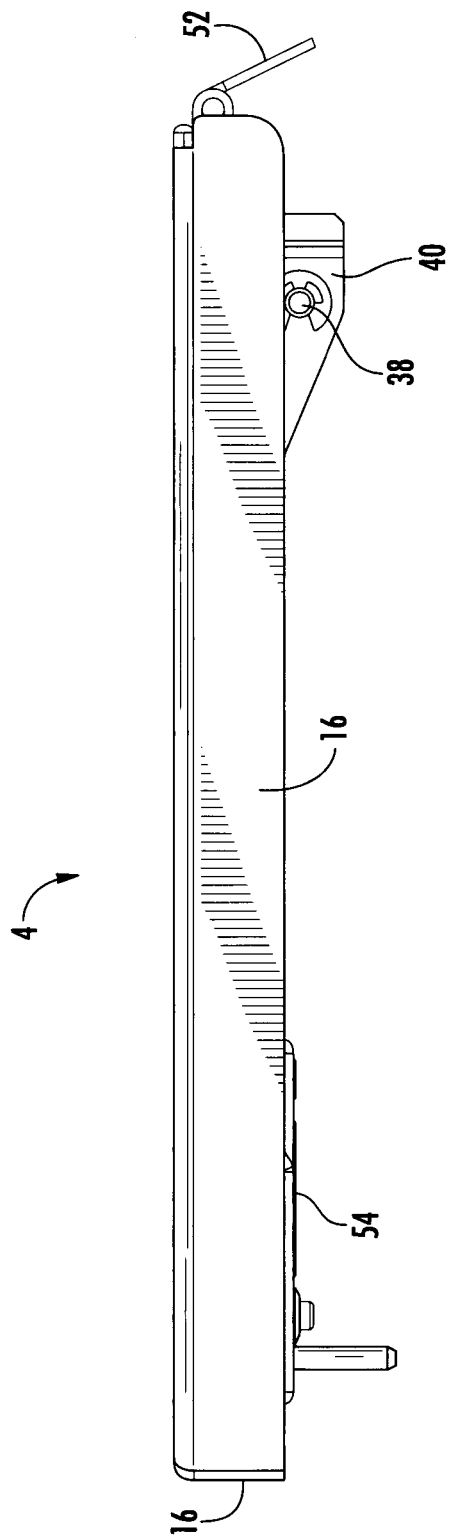
FIG. 39 is a right side view of the door assembly illustrated in FIG. 35.
Figure 40:
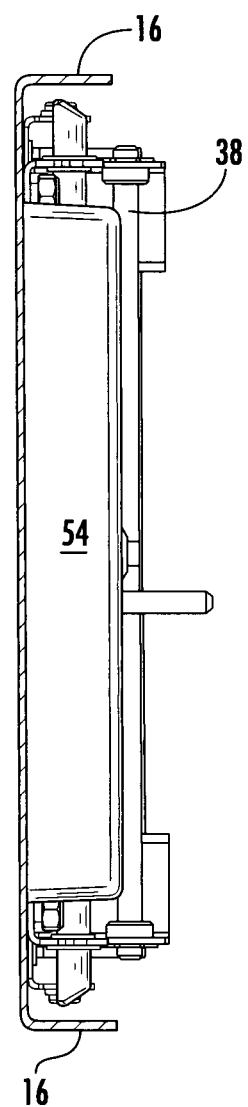
FIG. 40 is a section view taken along lines 40-40 of FIG. 38.
Figure 41:
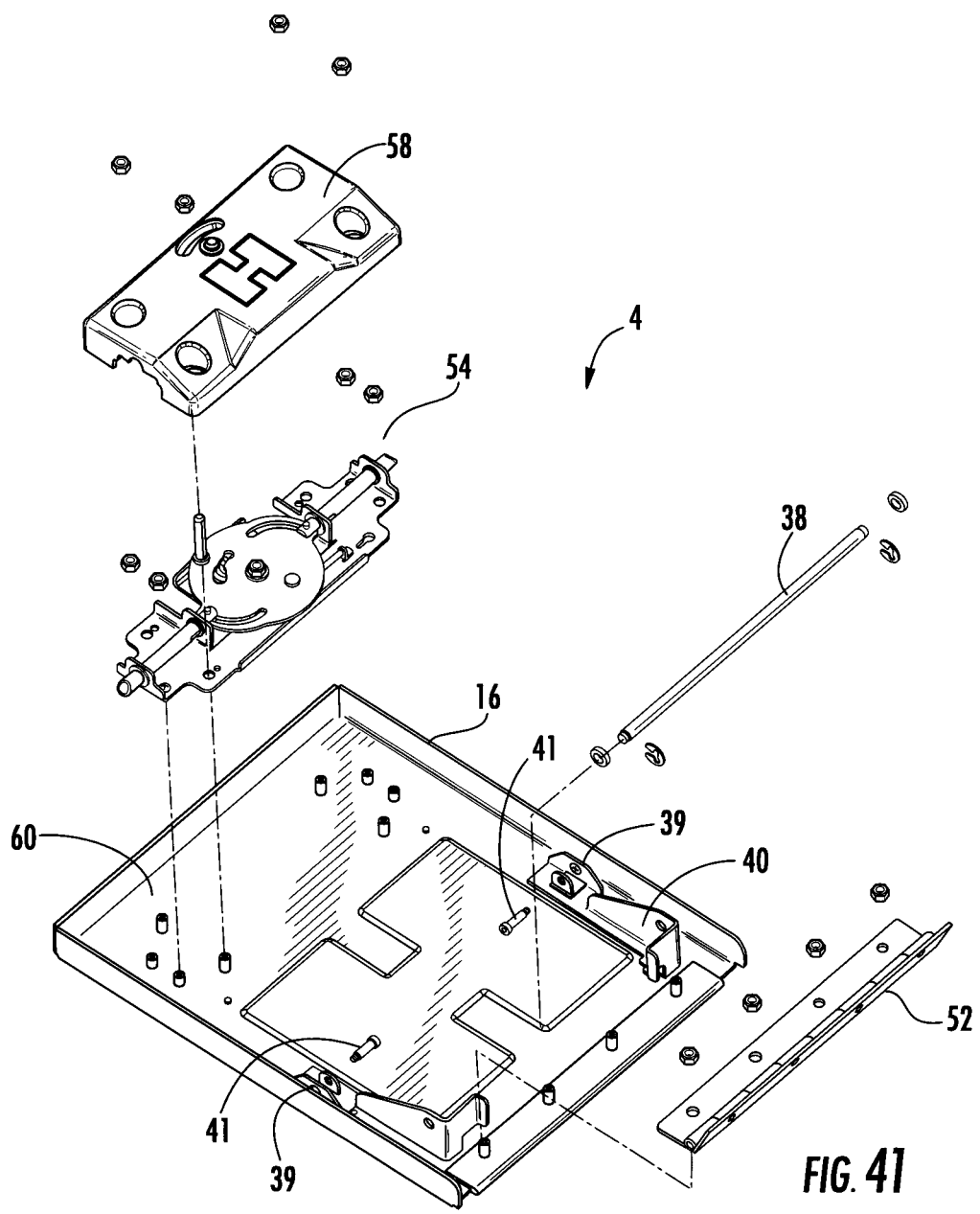
FIG. 41 is a partially exploded view of one embodiment of the door assembly.
Figure 42:
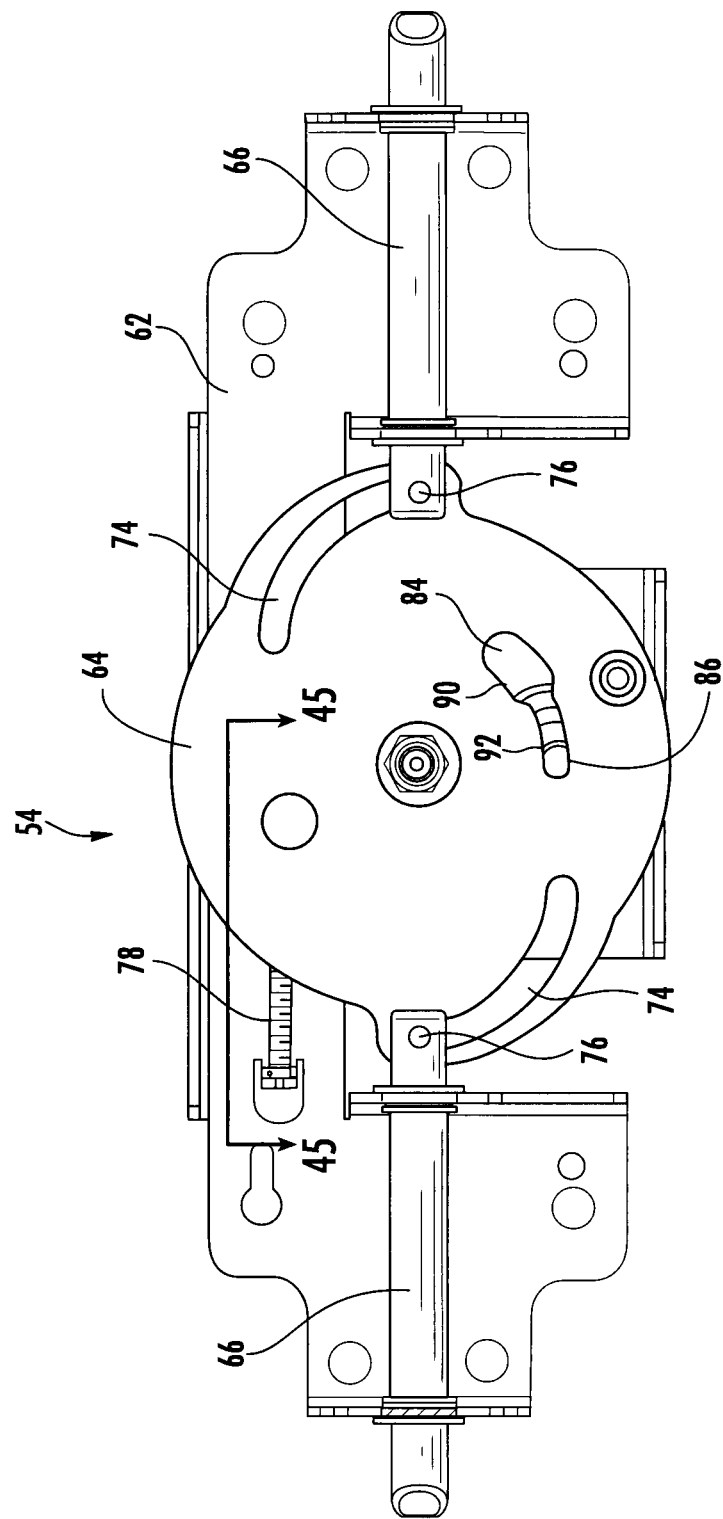
FIG. 42 is a bottom view of one embodiment of the latch assembly.
Figure 43:
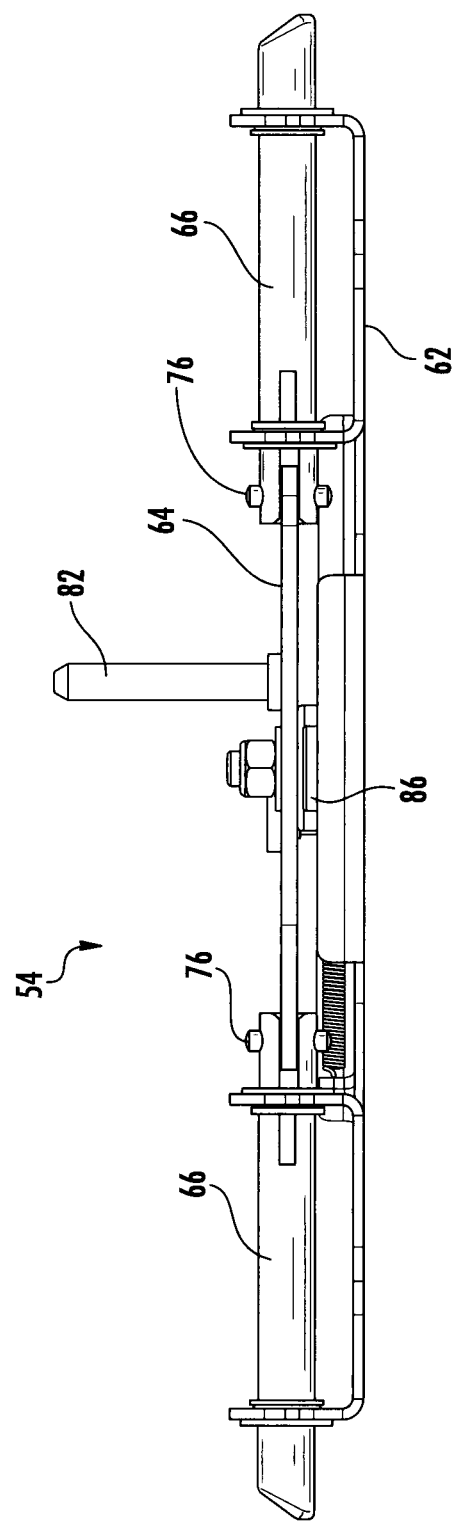
FIG. 43 is an end view of the latch assembly illustrated in FIG. 42.
Figure 45:
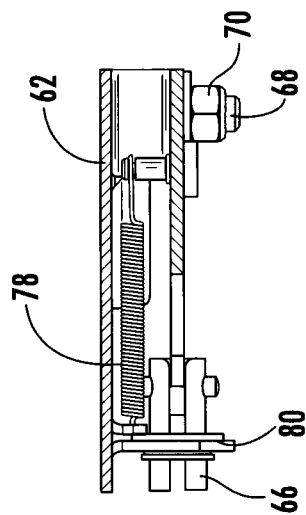
FIG. 45 is a section view taken along lines 45-45 of FIG. 42.
Figure 44:
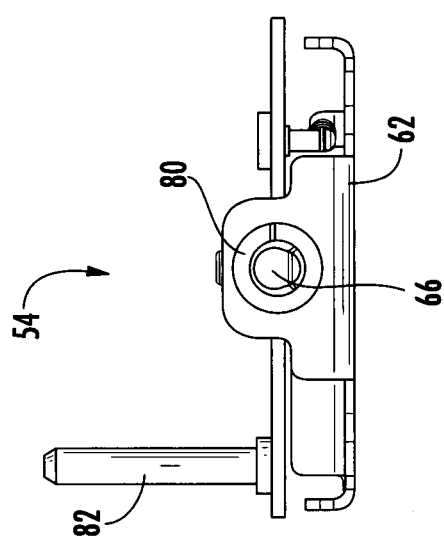
FIG. 44 is a left side view of the latch assembly illustrated in FIG. 42.
Figure 46:
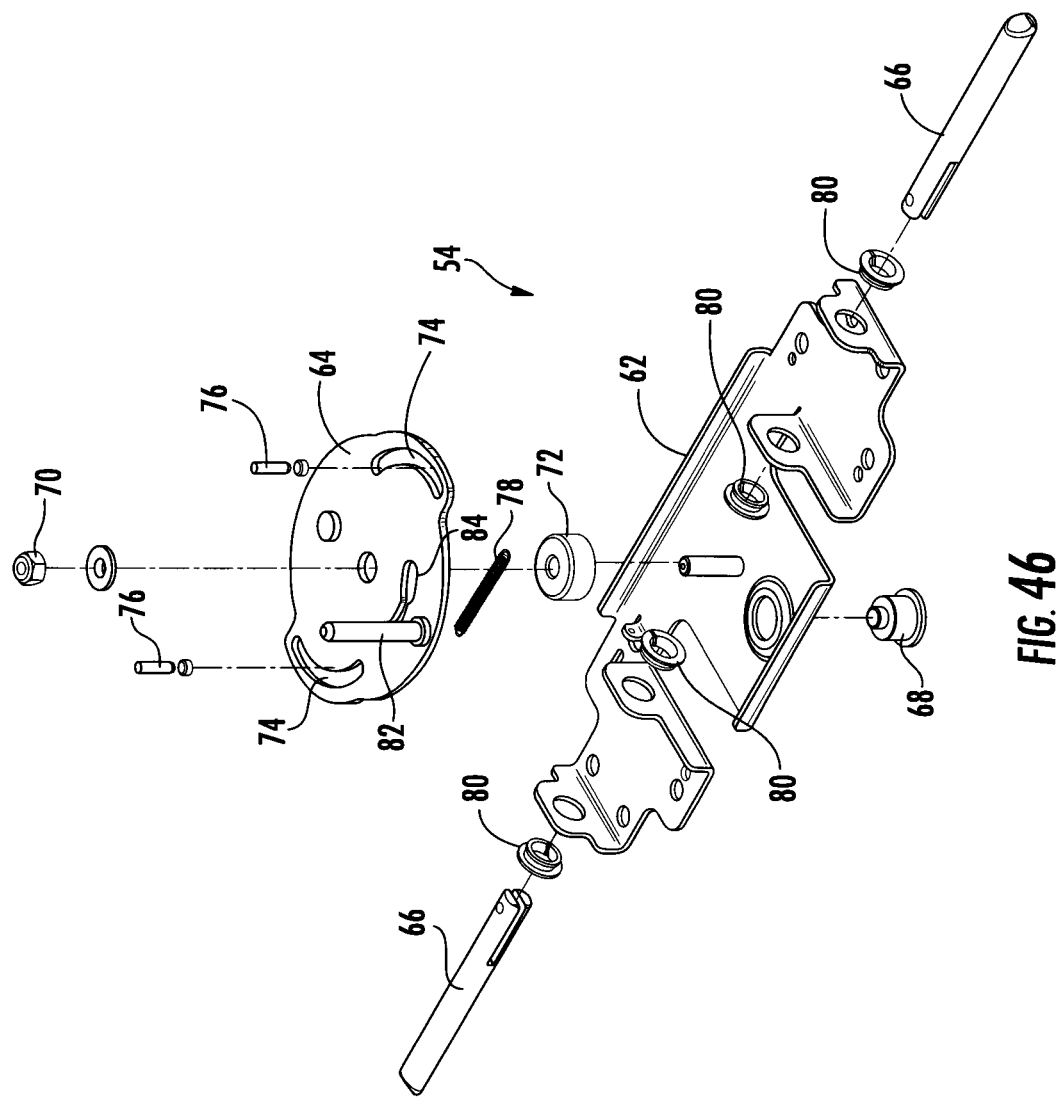
FIG. 46 is an exploded view of the latch assembly illustrated in FIG. 42.
Figure 47:
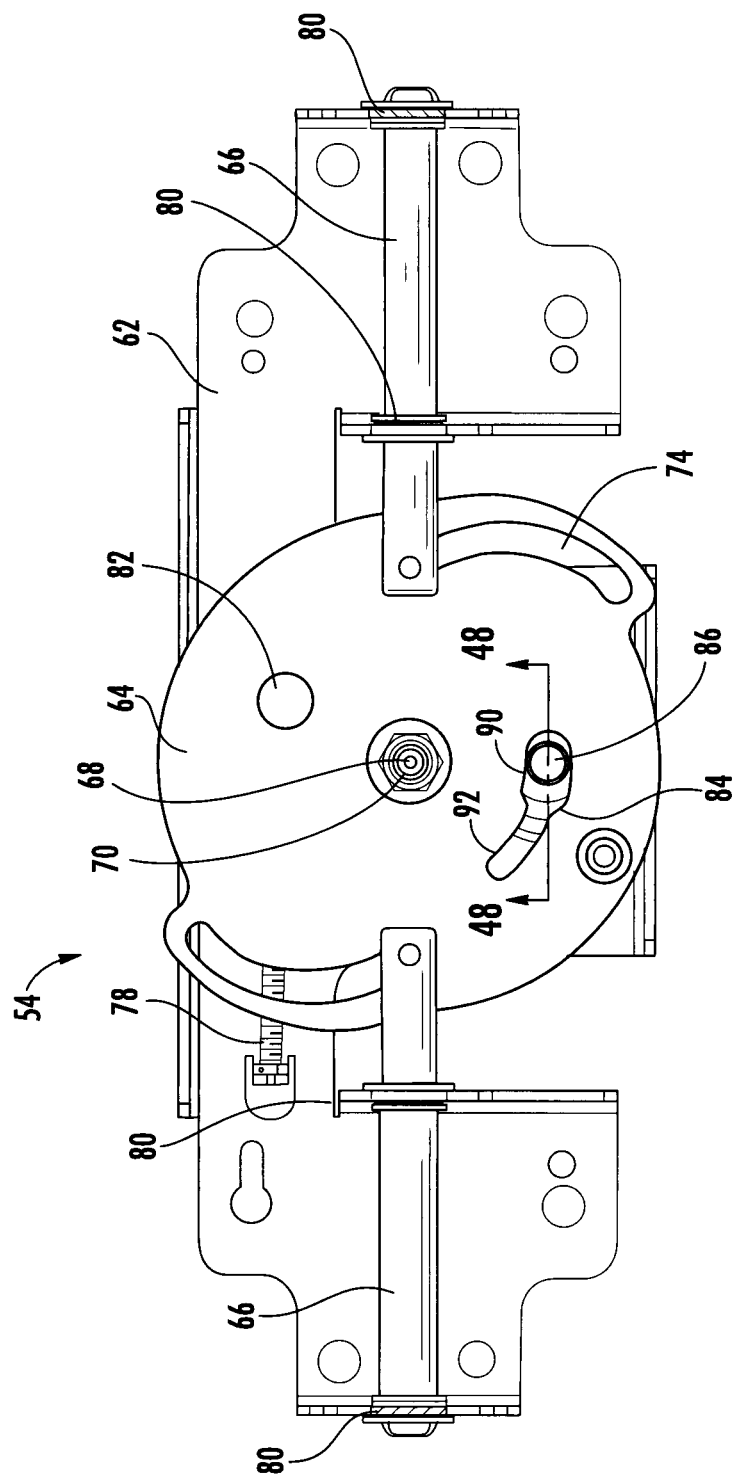
FIG. 47 is a bottom view of the latch assembly, illustrated in a retracted position.
Figure 48:
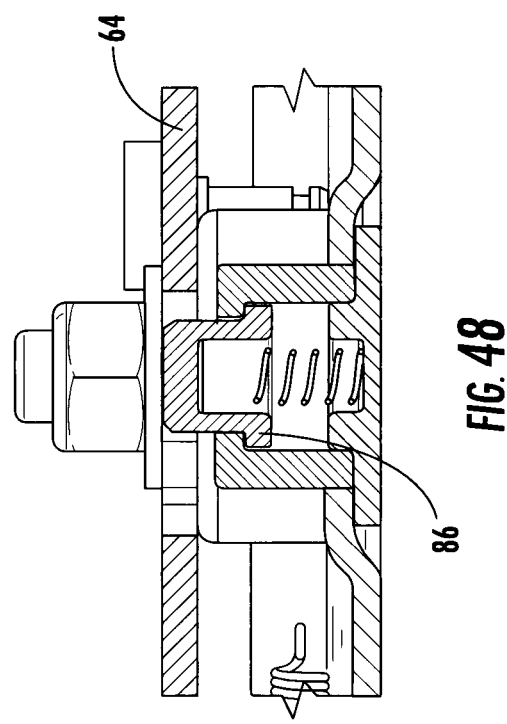
FIG. 48 is a section view taken along lines 48-48 of FIG. 47.

Referring to FIGS. 1-8, the box assembly is illustrated. The box assembly 2 generally houses the identification assembly 6, the weapon cartridge 8 and the release assembly 18 (FIGS. 56-59), and functions as the predominantly visible portion of the mini-vault 100. The box assembly 2 is typically a five paneled parallelepiped structure having one open side 12 for access to the contents of the box assembly. The box assembly is preferably constructed of a durable material such as steel, however, other materials that are suitable for use in safe construction may be utilized without departing from the scope of the invention. The box assembly preferably includes an offset lip 14, which extends around the perimeter of the open side 12. The offset lip 14 is adapted to cooperate with the door assembly 4, which includes a perimeter lip 16. The offset lip 14 and the perimeter lip 16 overlap each other to prevent wires, pry bars and the like from achieving unwanted access to the inside of the box assembly. Positioned adjacent the open side 12 is the control panel 20 for the identification assembly 6. The control panel 20 is removable (FIG. 2) to reveal a battery compartment 22, electronic circuit cover 24 and bypass lock 26. The battery compartment is provided to give the mini-vault portability to operate in places where grid power is not available through power inlet jack 28. Should there be no power available through the power inlet jack 28 or from the battery compartment 22, the bypass lock 26 may be operated with a bypass key as illustrated in FIG. 33. The circuit boards (not shown), including the interrogator for the RFID identification, are positioned below the circuit cover 24. The circuit cover 24 is formed from the same material as the box assembly 2 to prevent unauthorized access to the circuitry. The control panel 20 preferably includes a plurality of buttons 30 arranged in a similar layout to a human hand. Individuals who do not have access to the RFID tags that have been keyed to the device may use the buttons to open the mini-vault 100. The access code for the buttons is programmable after purchase to eliminate duplication of codes in mini-vaults from the factory.

Figure 8:
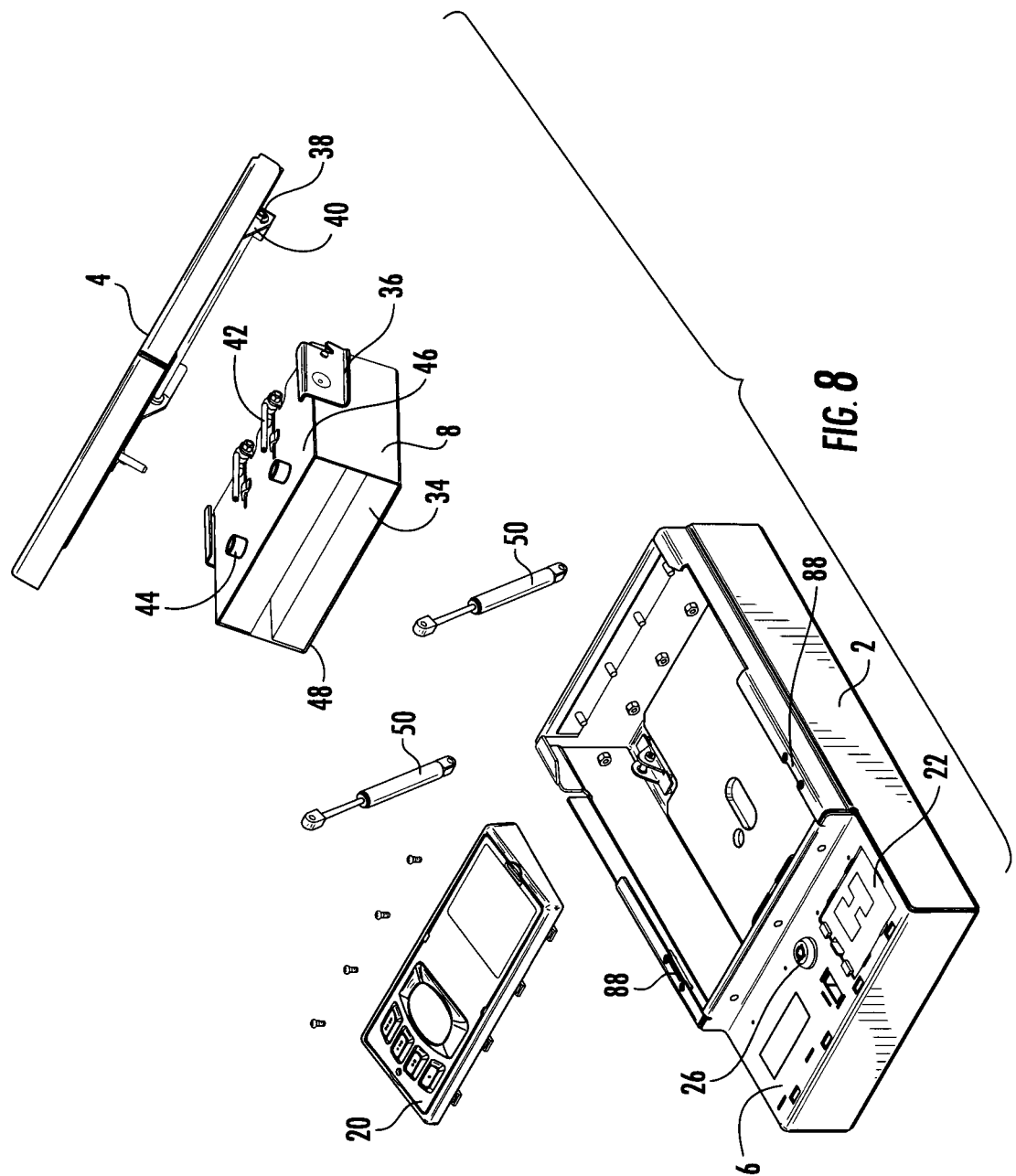
FIG. 8 is a partially exploded view of the mini-vault illustrated in FIG. 1.
Figure 9:
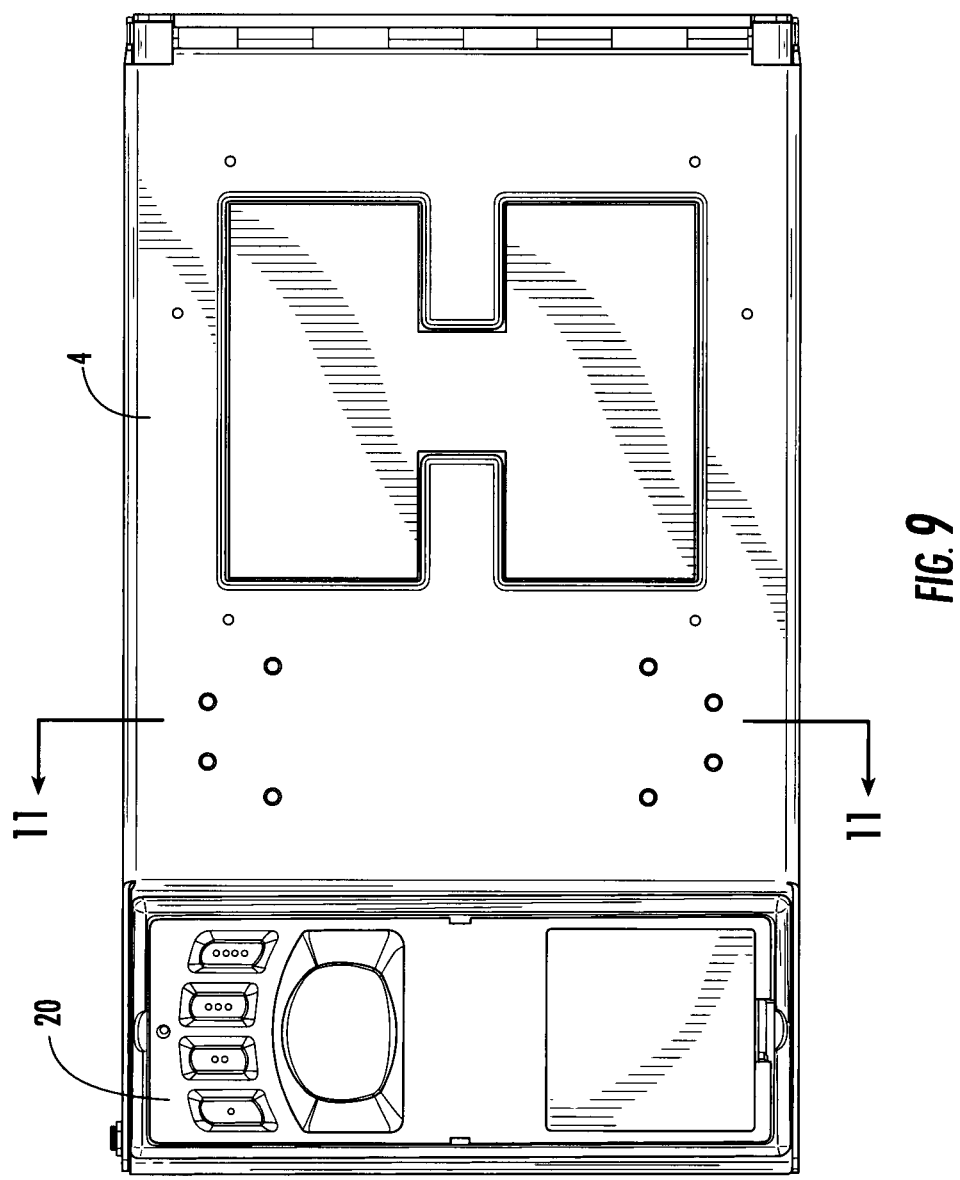
FIG. 9 is a top view of the mini-vault illustrated in FIG. 1.
Figure 10:
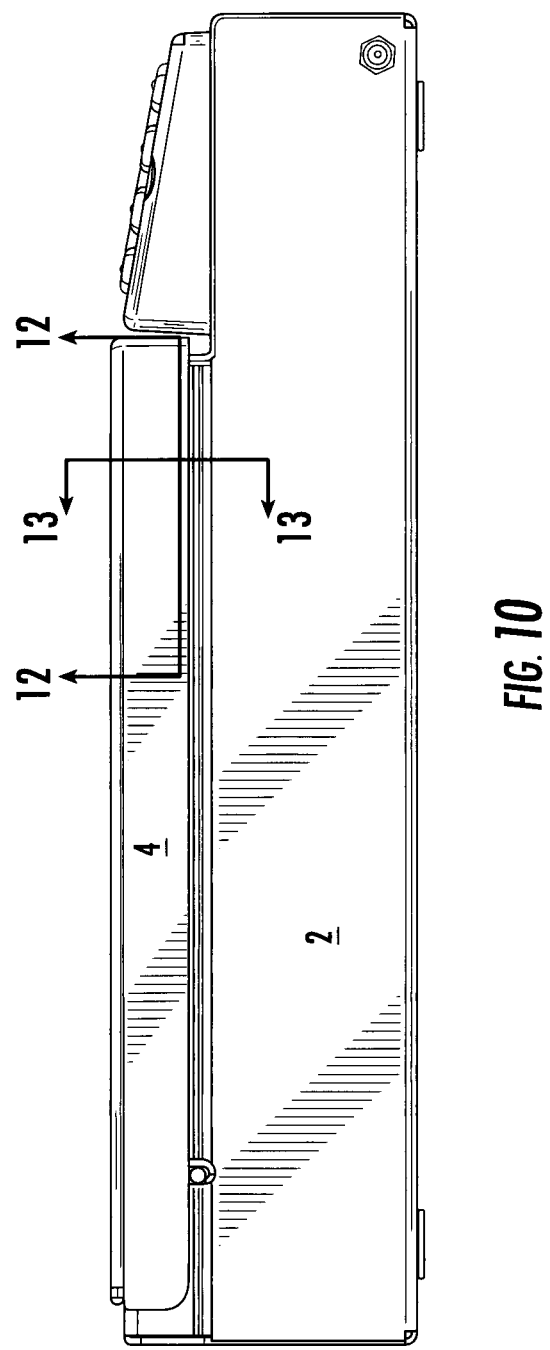
FIG. 10 is a left side view of the mini-vault illustrated in FIG. 1.
Figure 16:
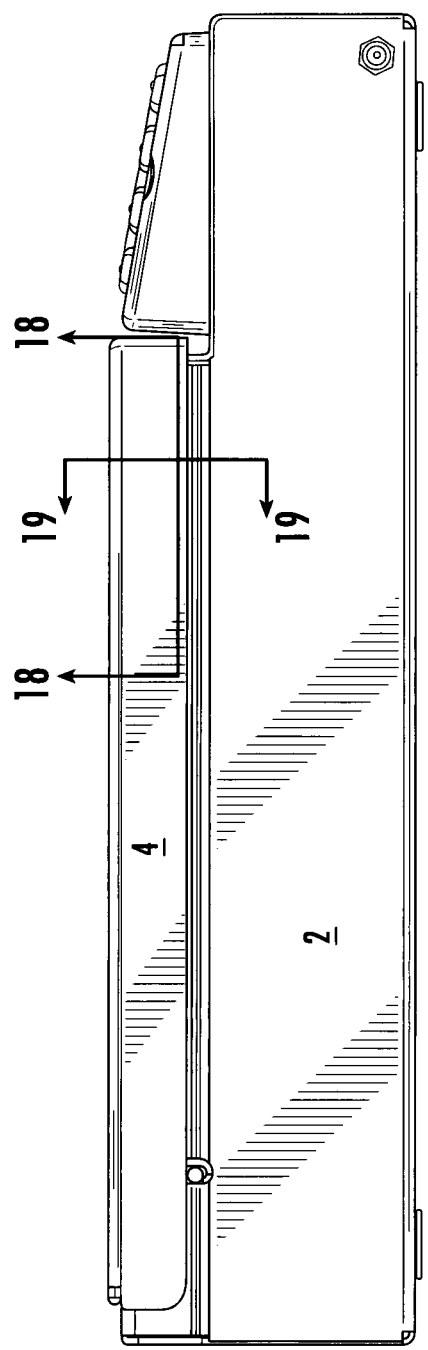
FIG. 16 is a left side view of the embodiment illustrated in FIG. 15.
Figure 17:
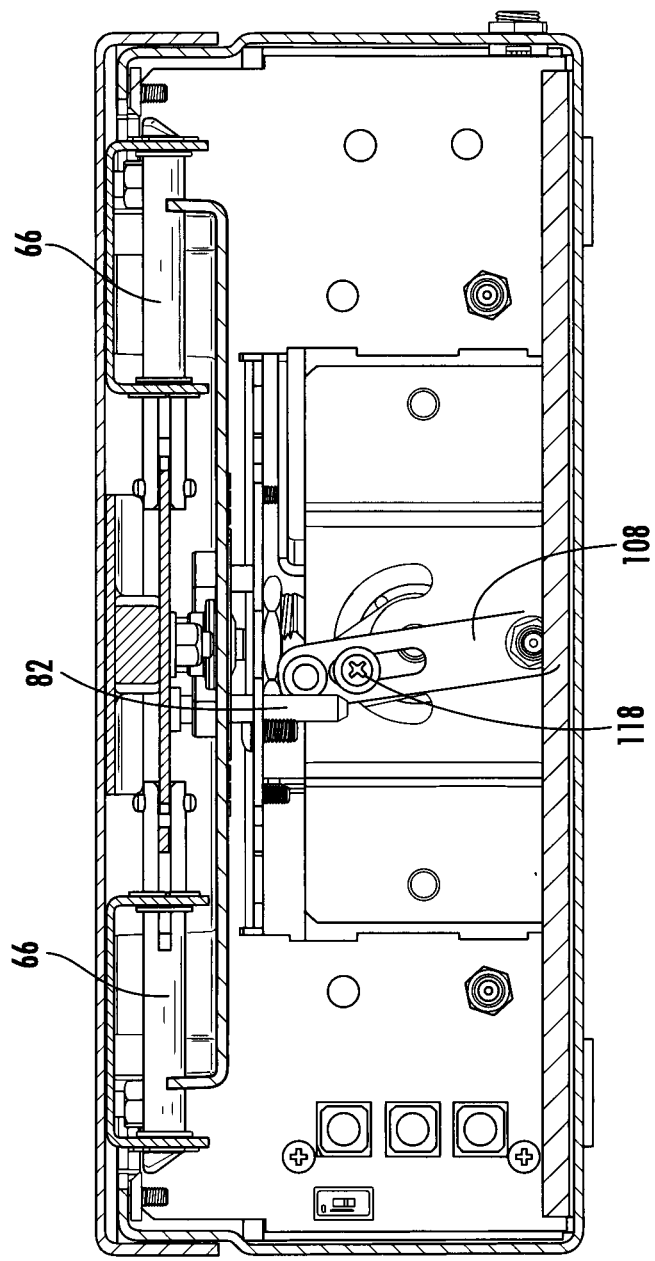
FIG. 17 is a section view taken along lines 17-17 of FIG. 15.

Referring to FIGS. 35-41, the door assembly 4 is illustrated. The door assembly 4 is constructed to enclose the open side 12 of the box assembly 2 and prevent unwanted access to the interior thereof. The door assembly generally includes a hinge 52, a weapon cartridge pivot pin 38, gas spring tabs 39 and the latch assembly 54. The door member 56 is preferably constructed from a durable material such as steel, however, other materials that are suitable for use in safe construction may be utilized without departing from the scope of the invention. The door member 56 includes perimeter lips 16 about three sides thereof with the hinge 52 extending across the rear edge. The perimeter lips 16 overlap the offset lip 14 of the box assembly when the door assembly 4 is in a closed position. The hinge 52 is preferably a piano type hinge, which extends substantially entirely across the rear portion of the mini-vault 100 and includes a plurality of apertures for fasteners or weldments. Depending tabs 40 are provided for attachment of the gas springs 50 (FIG. 8). In this manner, the gas springs 50 are allowed to open the door assembly while pivoting around gas spring pins 41. The latch assembly 54 is constructed and arranged to interlock with the box assembly 2 in a latched condition while allowing the door assembly 4 to spring open when desired. The latch assembly 54 is secured to the inner surface of the door member 56, and includes a cover member 58 to cover and protect the latch assembly 54.

Figure 6:
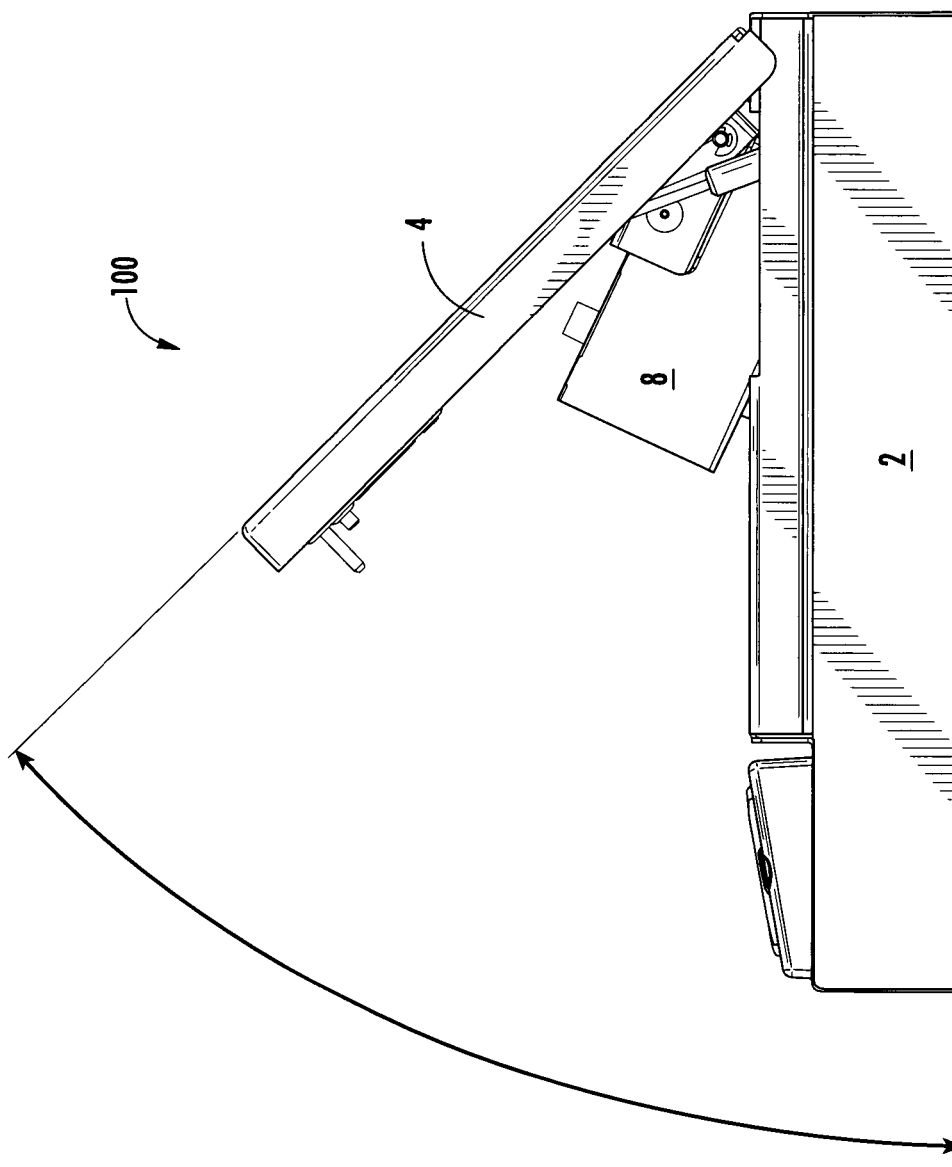
FIG. 6 is a right side view of the embodiment shown in FIG. 1, illustrated with the door assembly in an open position.
Figure 7:
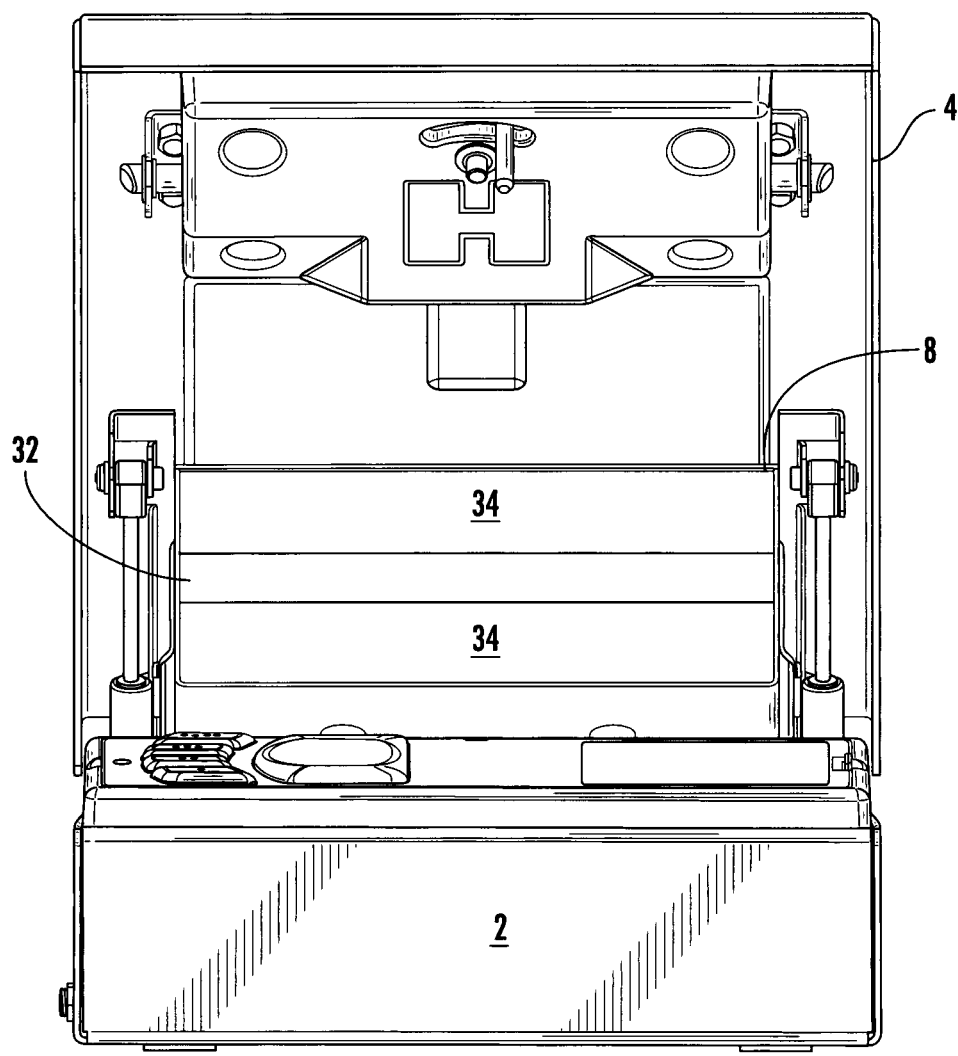
FIG. 7 is a front view of one embodiment of the mini-vault, illustrated with the door assembly in an open position.

Referring to FIGS. 6-8, the mini-vault 100 is illustrated in an open position. In the preferred embodiment, the door assembly will automatically open to about forty-five degrees with respect to the box assembly upon the proximate passing of the proper RFID. The weapon cartridge 8 is pivotally secured to the bottom surface of the door assembly to pivot about half as much as the door assembly. In this manner, the weapon cartridge 8, and thus the grip of the weapon (not shown), is presented about midway between the door assembly and the box assembly for easy grasping. In the preferred embodiment, the weapon cartridge 8 is a box like structure having an open center chamber 32. The center chamber 32 includes foam fillers 34 that are constructed and arranged to generally conform to the shape of a weapon, e.g. handgun, and allow the weapon to be easily inserted and removed from the cartridge. The outer surface of the cartridge 8 includes a pair of clamps 36 for securing the cartridge to the door assembly. The clamps 36 cooperate with a pivot pin 38 secured to the bottom surface of the door assembly via depending tabs 40 in a pivoting manner. The clamps 36 are constructed and arranged to allow removal of the cartridge from the mini-vault 100. Torsion springs 42 are provided to push against the bottom surface of the door assembly 4 to center the weapon cartridge 8 when the door assembly is in an open position. Bumpers 44 are provided on the upper 46 and lower 48 surfaces of the cartridge 8 to prevent the cartridge from unwanted movement during transport of the mini-vault 100. Gas springs 50 are provided to open the door assembly. The gas springs are constructed and arranged to support the weight of the door assembly, the cartridge and a weapon that may be inside of the cartridge. It should be noted that while gas springs are illustrated, various types of springs could be substituted without departing from the scope of the invention.

Referring to FIGS. 42-52, the latch assembly is illustrated. The latch assembly includes frame member 62, cam member 64, and locking pins 66. The frame member 62 provides a mounting structure for the components of the latch assembly that is easily secured to the inner surface 60 of the door member 56. The cam member 64 is rotatably secured to the frame member 62 via shoulder fastener 68 and nut 70 while bushing 72 assures free rotation of the cam member 64. The lock pins 66 are secured to the cam slots 74 via rolling cam followers 76. The rolling cam followers 76 extend through the cam slots 74 and through the ends of the lock pins 66. The lock pins 66 are secured to the frame member 62 via lock pin bushings 80 for linear movement in response to rotation of the cam member. A spring member 78 biases the cam member so that the lock pins default to an extended or locked position. The cam member 64 also includes a reset slot 84, which cooperates with reset pin 86 to hold the lock pins 66 in a retracted position until the lock pins pass the catch plates 88 (FIG. 2) on the box assembly 2. This construction allows the lid to close freely without the need to force the lock pins to the retracted position during closing of the door assembly 4. The reset slot 84 includes a first width 90 and a second width 92. The first width 90 is sufficiently wide to allow the reset pin 86 to extend through the cam member 64 while the second width will not allow the reset pin 86 to pass. The reset pin 86 is spring biased to an extended position whereby, when the cam rotates sufficiently to retract the lock pins, the reset pin extends through the cam member, thereby preventing the cam from rotating to a position that extends the lock pins. (FIGS. 47-50) Depression of the reset pin 86 allows the cam to rotate and the lock pins to extend. (FIGS. 42, 51-52) Cam lever 82 provides rotation to the cam member 64 in response to operation of the release assembly 18 (FIG. 56-59) or bypass lock 26 to cause the lock pins to retract.

Figure 53:
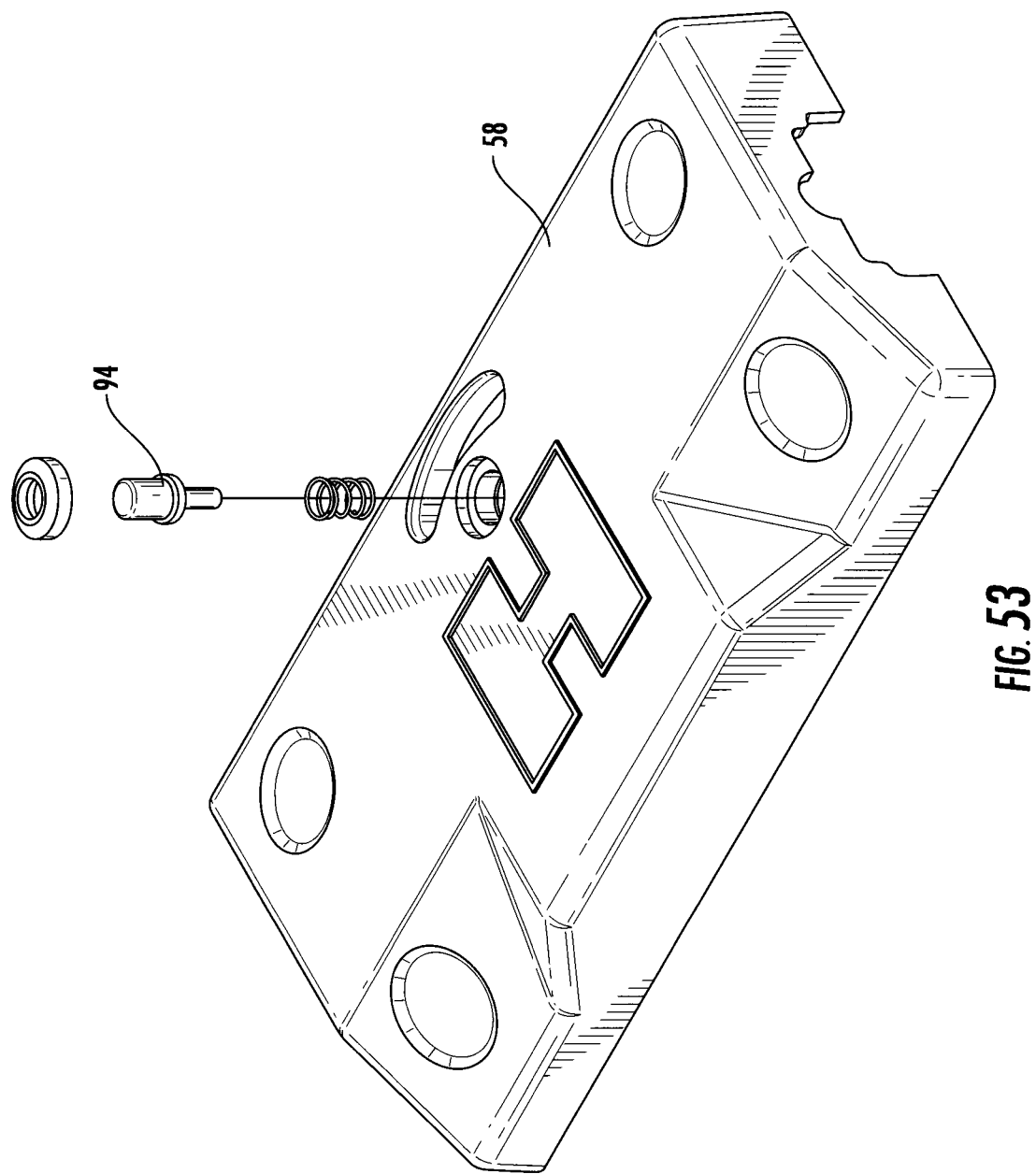
FIG. 53 is a top right perspective view of a shroud for the latch assembly.
Figure 54:
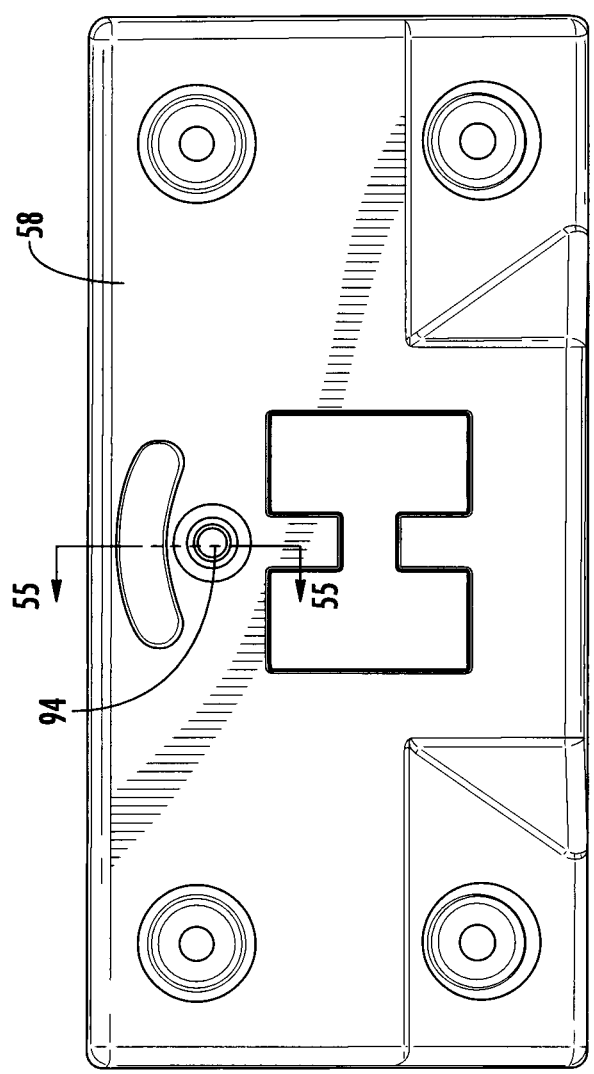
FIG. 54 is a top view of the shroud illustrated in FIG. 53.
Figure 55:
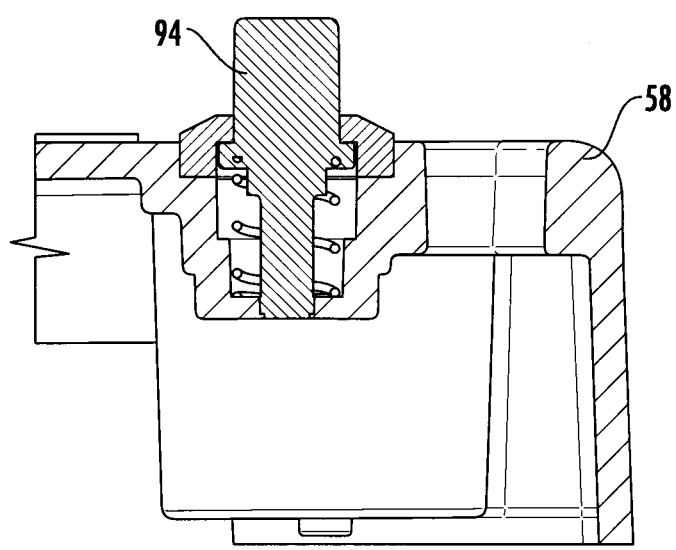
FIG. 55 is a section view taken along lines 55-55 of FIG. 54.
Figure 56:
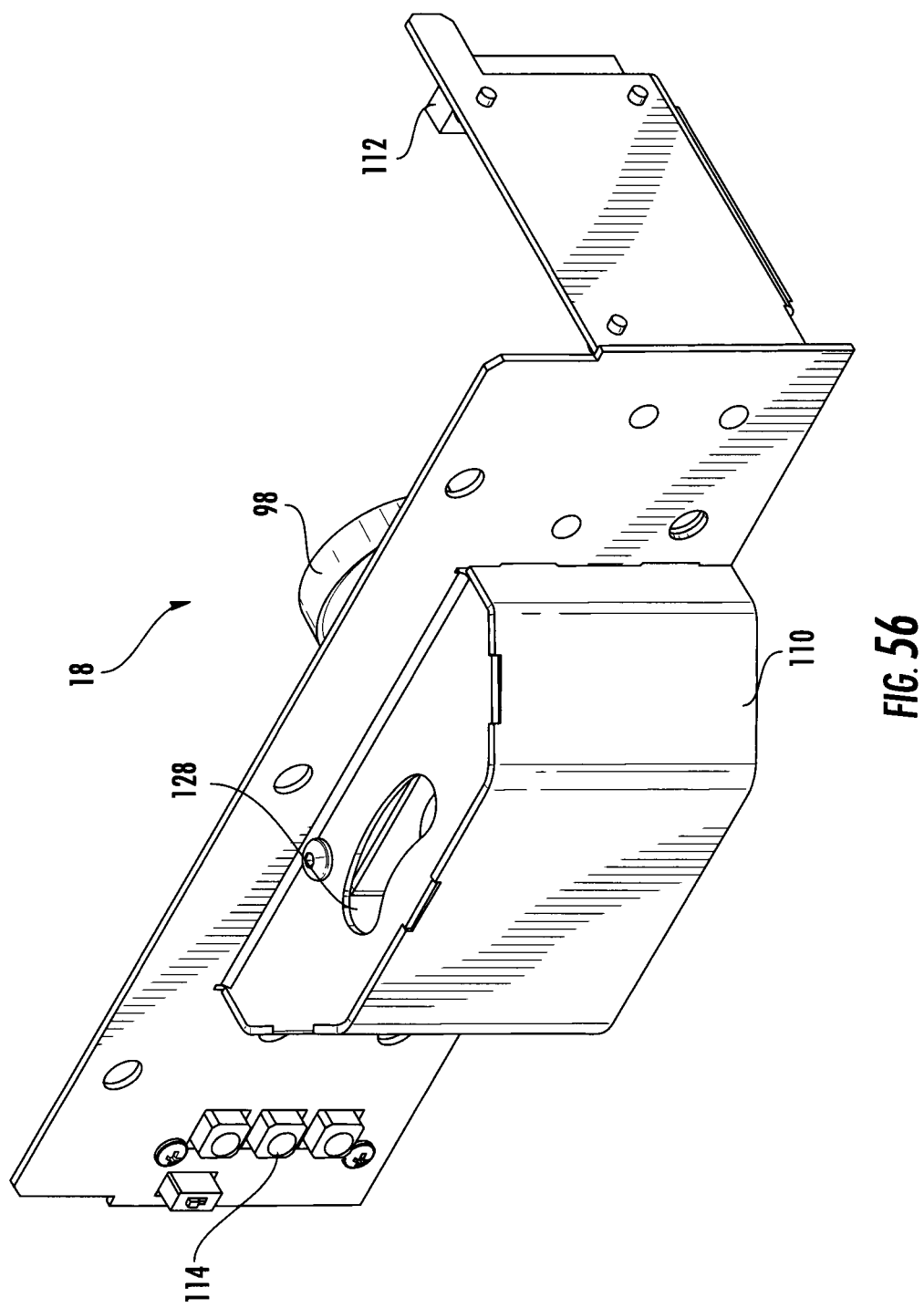
FIG. 56 is a top right perspective view of the release assembly.
Figure 57:
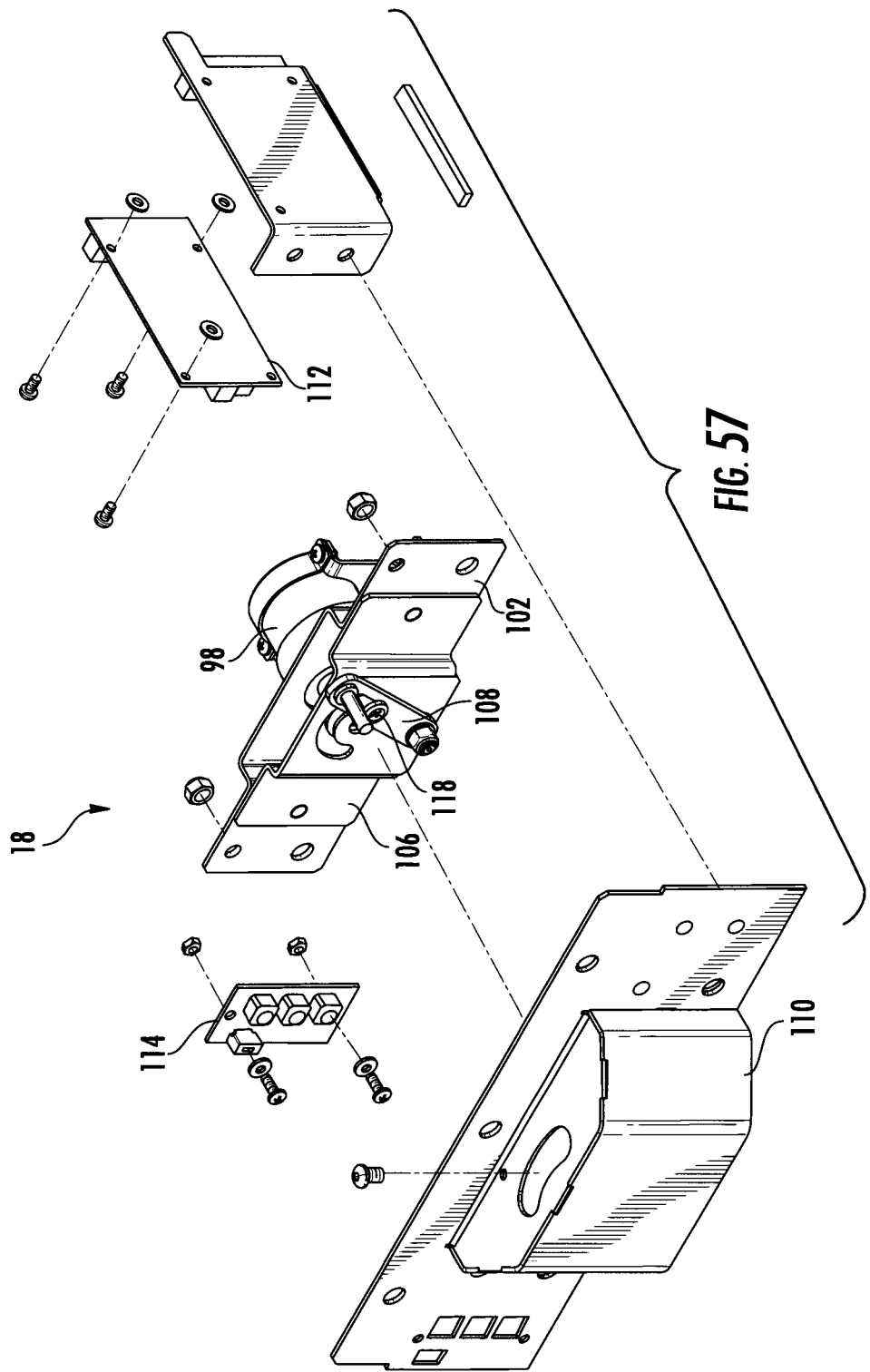
FIG. 57 is a partially exploded view of the release assembly.
Figure 58:
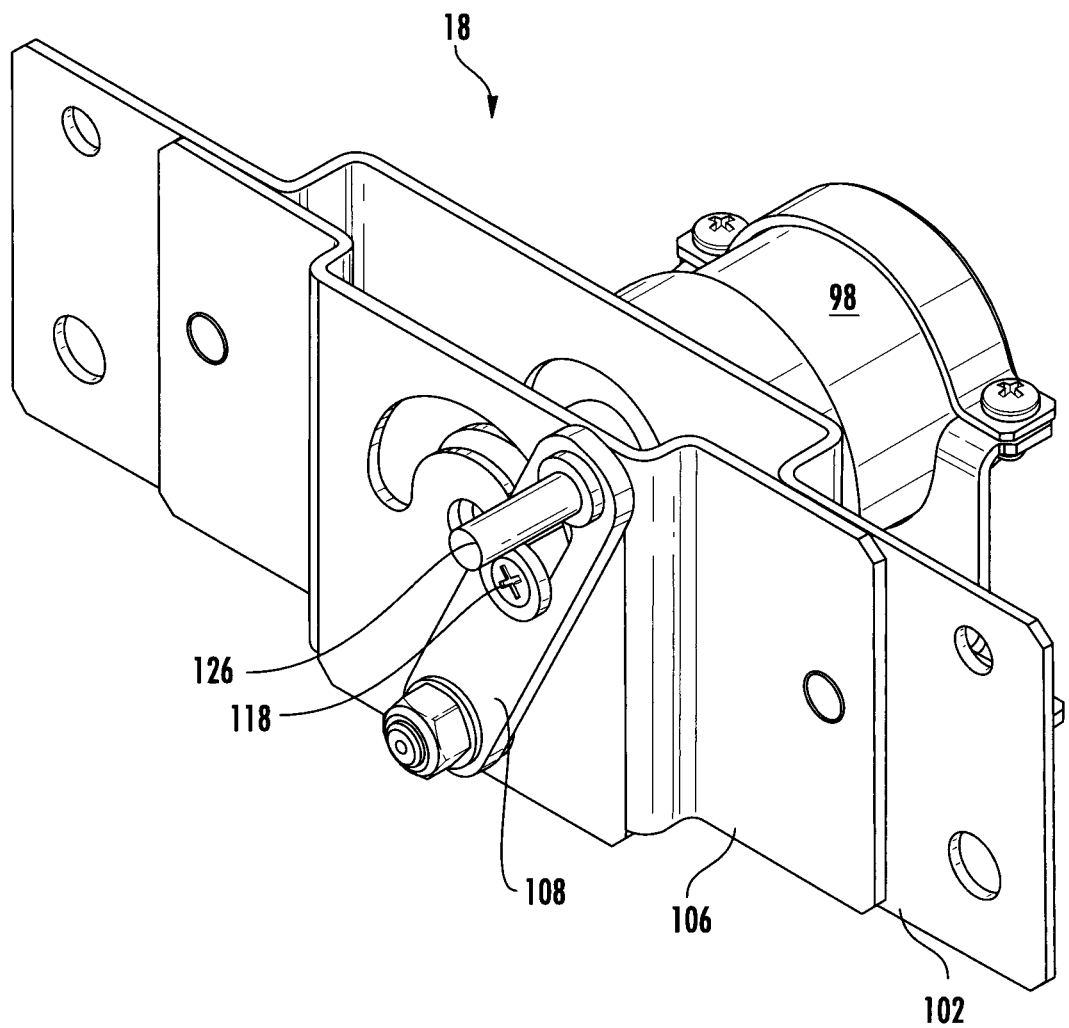
FIG. 58 is a top right perspective view of the release assembly.
Figure 59:
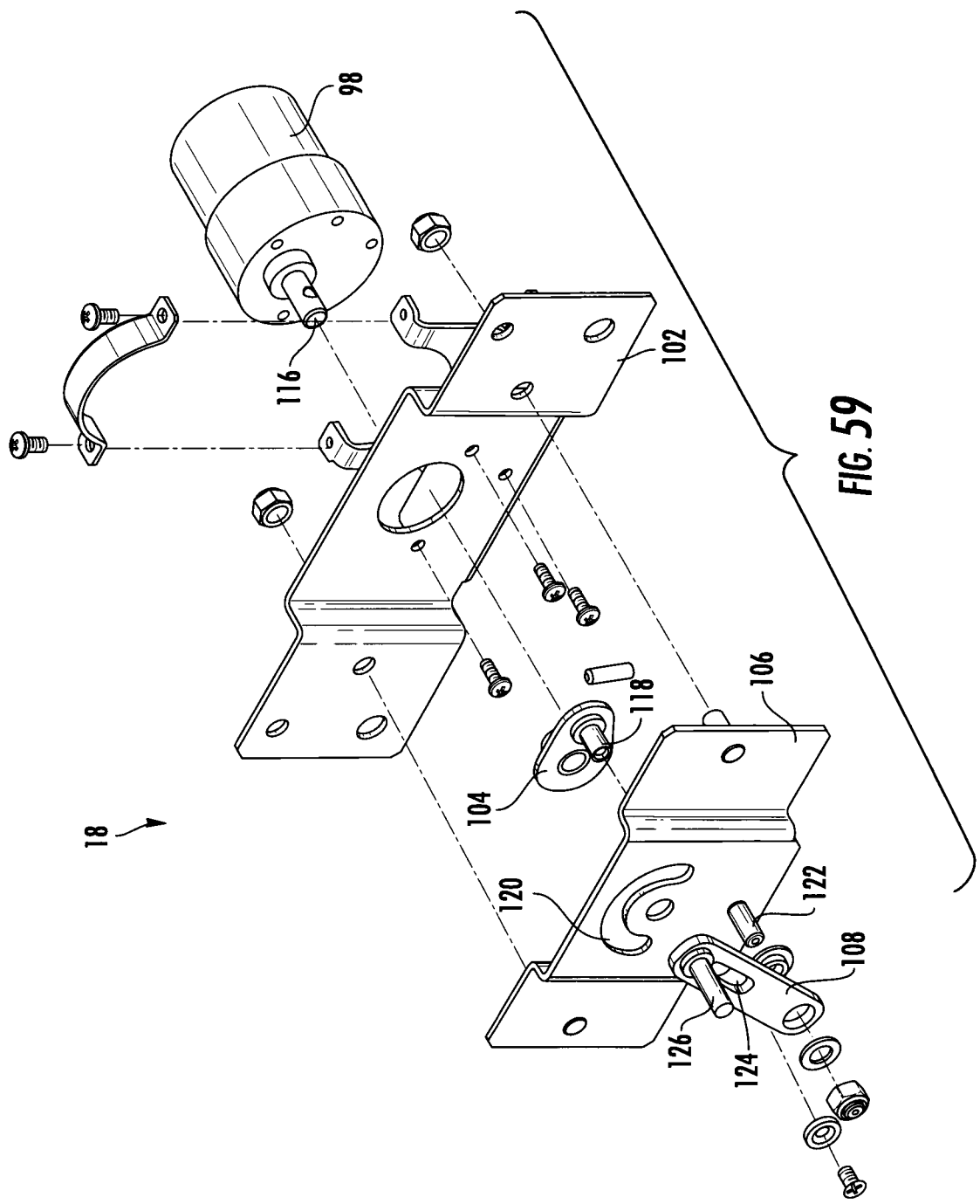
FIG. 59 is an exploded view of the release assembly illustrated in FIG. 58.

Referring to FIGS. 53-55, the latch assembly cover 58 is illustrated. The latch assembly cover generally covers and provides protection to the latch assembly 54. The latch assembly cover 58 includes the reset button 94 which is biased to extend away from the cam member 64. The reset button 94 is positioned to cooperate with the reset pin 86, which allows manual and automatic operation of the reset pin with the latch assembly cover in position. In this manner, when the door assembly is closed, the reset button 94 strikes the cover for the release assembly 18 once the door assembly has closed sufficiently for the lock pins 66 to pass the catch plates 88 (FIG. 2) of the box assembly 2. As described earlier, this construction allows the door assembly to be closed without resistance from the lock pins 66 striking the catch plates. This construction also allows the lock pins 66 to extend much farther past the edges of the catch plates than would be possible if the catch plates deflected the lock pins, providing an enclosure that is resistant to opening upon drops or abuse of the mini-vault.

Referring to FIGS. 56-59, the release assembly 18 is illustrated. The release assembly 18 is generally constructed and arranged to operate the latch assembly 54 to cause the door assembly 4 to open in response to communication with an RFID chip 96. The release assembly includes an electric motor 98, a support frame 102, an offset arm 104, a guide plate 106, a release lever 108, and a release assembly cover 110. The motor is in electrical communication with the circuit boards 112, 114 and control panel 20 and secured to the support frame 102, which is in turn secured within the box assembly 2. The motor 98 in the preferred embodiment includes an internal gear reduction, which reduces output shaft speed and increases torque of the motor. The output shaft 116 of the motor extends through the support frame 102 and is secured to the offset arm 104 to cause rotation thereof through a predetermined path. The offset arm 104 includes a follower pin 118, which extends through the guide plate 106, which includes guide slot 120 to limit the travel of the offset arm and thus the motor. The release lever 108 is pivotally secured over the pivot pin for rotation thereabout. The release lever includes a second guide slot 124 positioned to cooperate with the follower pin 118 to cause rotation of the release lever 108. The release lever 108 also includes a release pin 126. The release pin is positioned to cooperate with the cam lever 82 of the latch assembly 54 to retract the lock pins 66 so they may pass the catch plates 88 under pressure from the gas springs 50, which allows the door assembly 4 to spring open and present the weapon for the user. Upon the follower pin 118 reaching the distal end of the guide slot 120, the motor 98 reverses, causing the follower pin to be positioned at the opposite end of the guide slot 120. The cover 110 provides protection for the release assembly 18 and the circuit boards 112, 114 and is generally constructed from a durable material such as, but not limited to steel. The cover 110 includes slot 128, which allows cam lever 82 to enter into the release assembly for operation thereof.

Referring to FIGS. 9-14, operation of the latch assembly in a locked position is illustrated with the cover members 58, 110 removed for clarity. As shown in FIG. 11, the release mechanism is shown in a home position whereby the release lever 108 and the follower pin 118 are positioned at the first end of the guide slot 120. In this position, the lock pins 66 are positioned well under the catch plates 88 holding the door assembly 4 in a closed and locked position. As shown in FIG. 12, the cam member 64 is rotated, creating a solid link from the distal end of one locking pin to the distal end of the other. This construction prevents the mini-vault from opening as a result of shock being imparted to the device. As illustrated in FIGS. 13-14, the reset pin 86 is positioned below the cam member and below the second width 92 of the reset slot which will allow the cam member 64 to be rotated by the release assembly 18.

Figure 18:
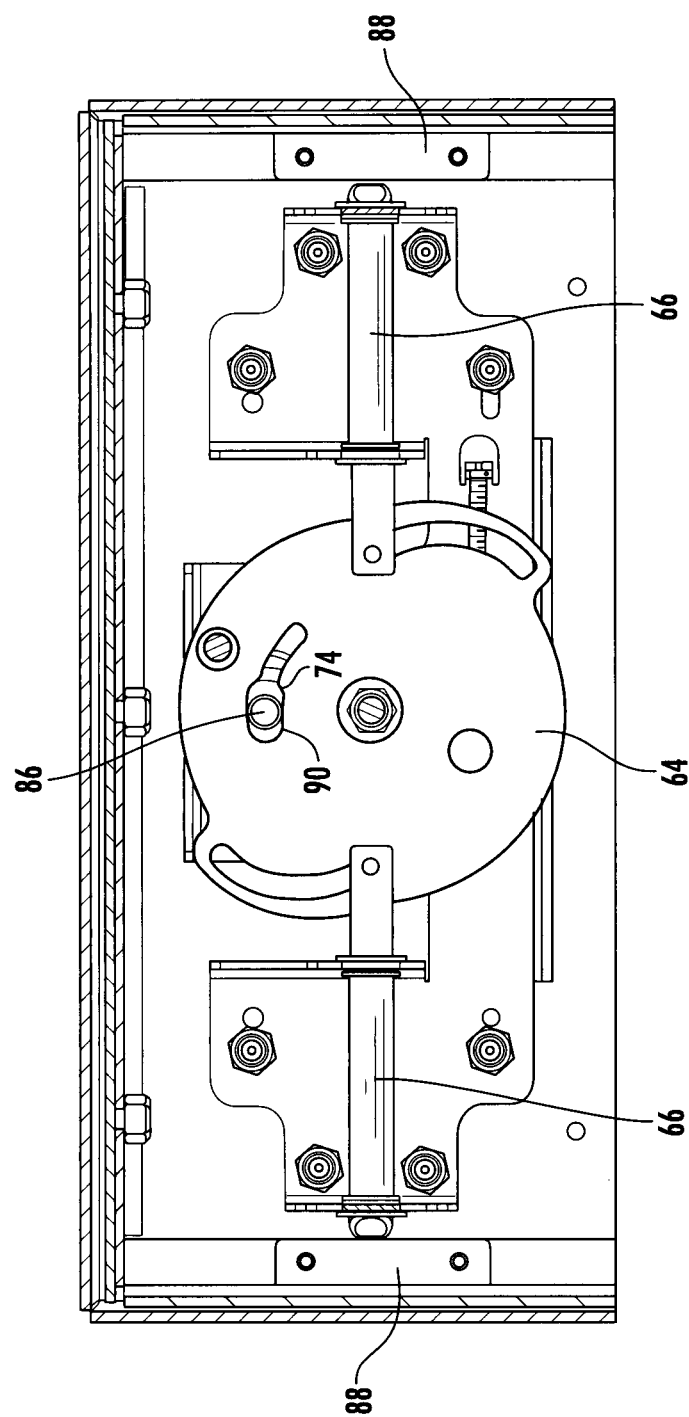
FIG. 18 is a section view taken along lines 18-18 of FIG. 16.
Figure 21:
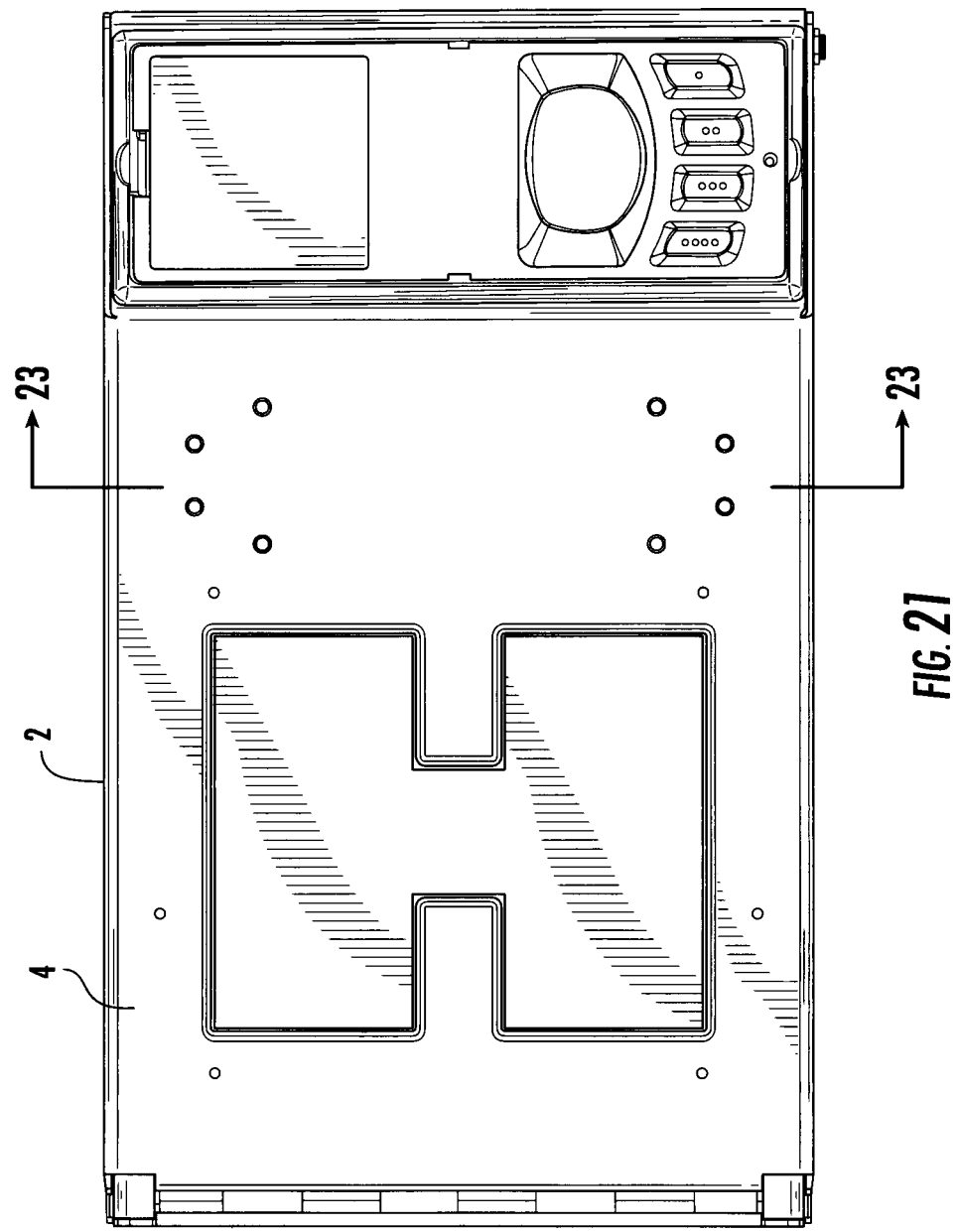
FIG. 21 is a top view of the embodiment illustrated in FIG. 1.
Figure 22:
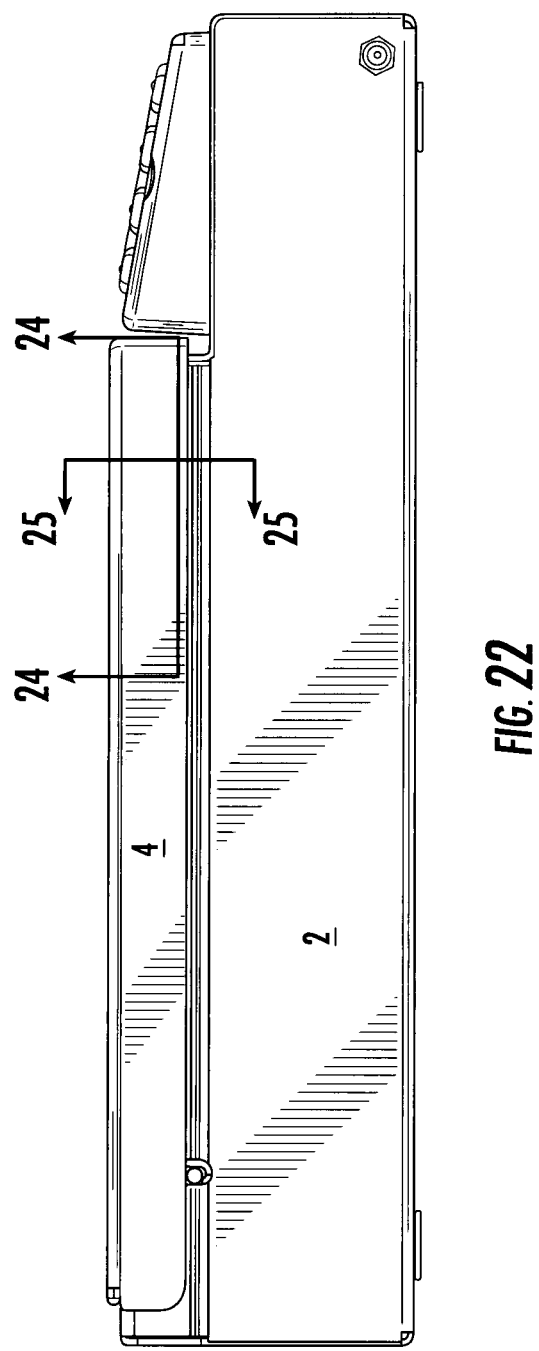
FIG. 22 is a left side view of the embodiment illustrated in FIG. 21.
Figure 23:
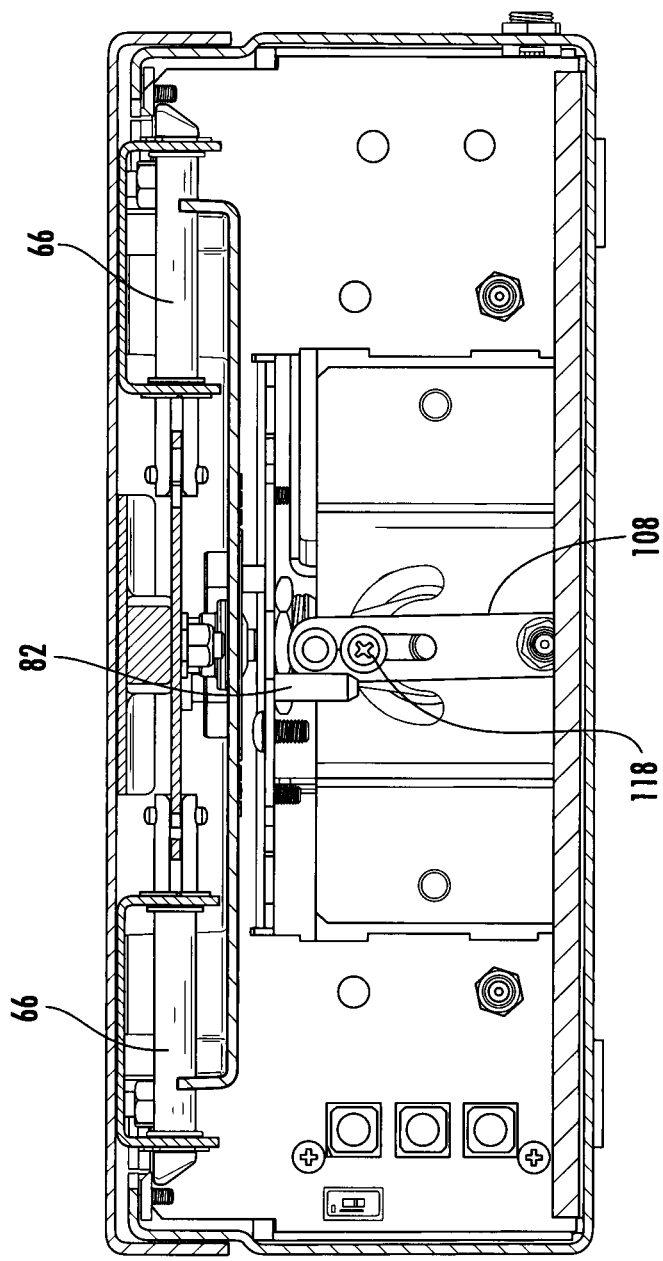
FIG. 23 is a section view taken along lines 23-23 of FIG. 21.
Figure 26:
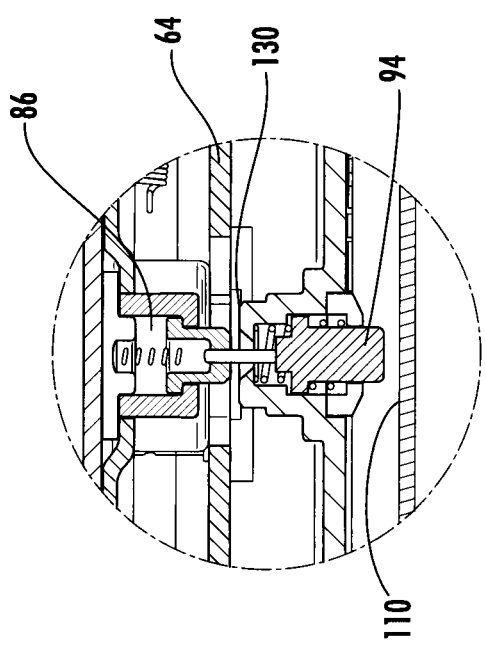
FIG. 26 is a section view taken along lines 26-26 of FIG. 25.
Figure 25:
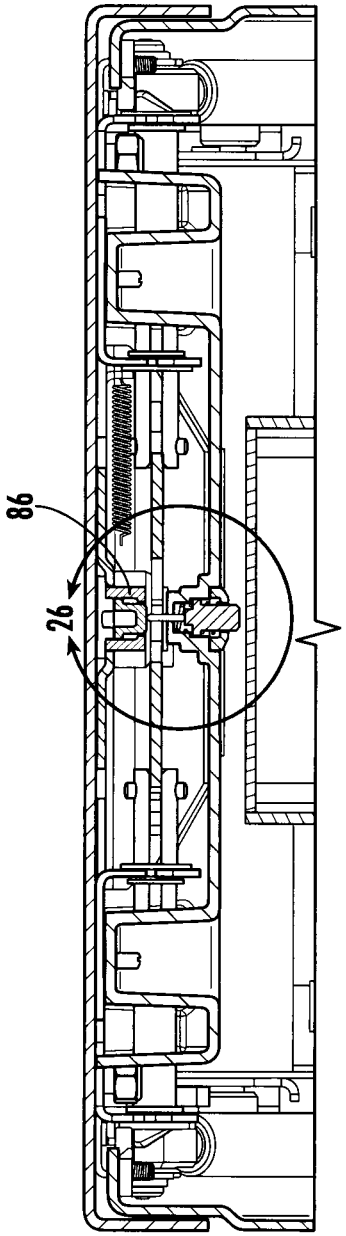
FIG. 25 is a section view taken along lines 25-25 of FIG. 22.
Figure 28:
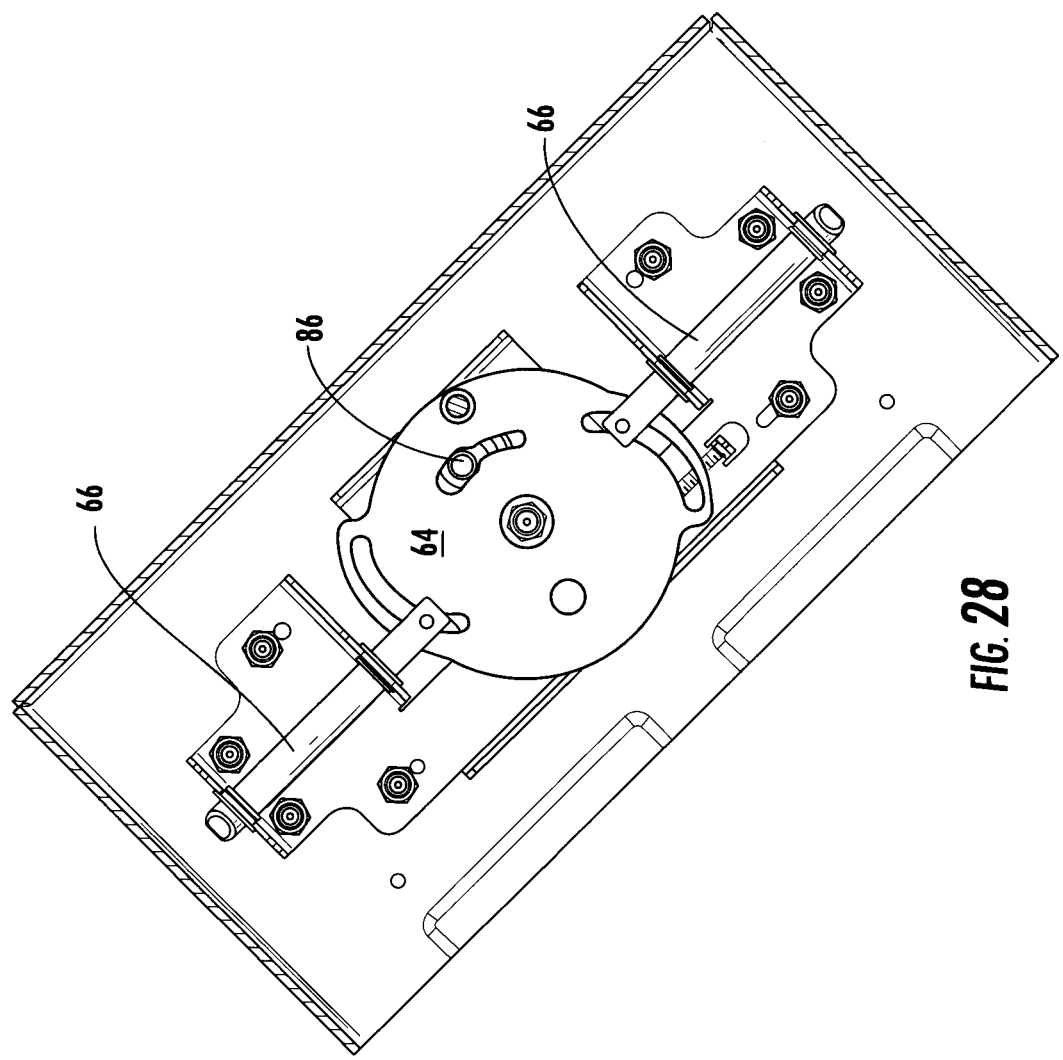
FIG. 28 is a section view taken along lines 28-28 of FIG. 27.
Figure 29:
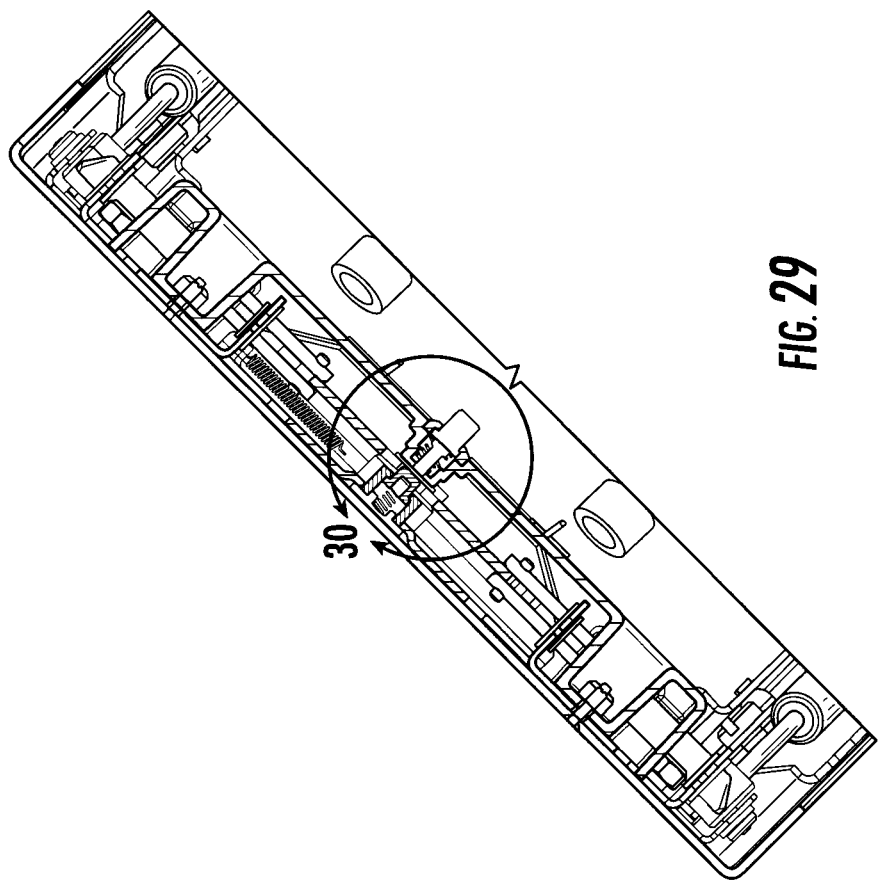
FIG. 29 is a section view taken along lines 29-29 of FIG. 27.
Figure 30:
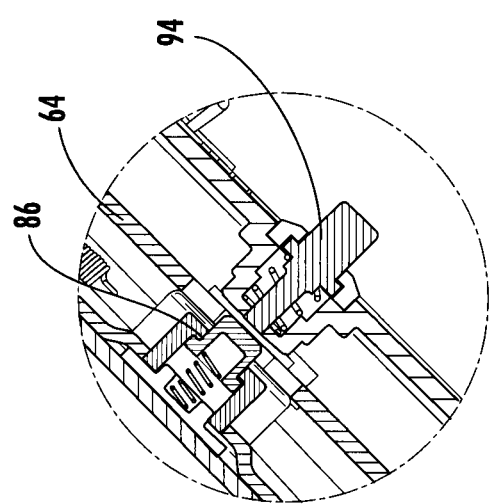
FIG. 30 is a section view taken along lines 30-30 of FIG. 29.
Figure 31:
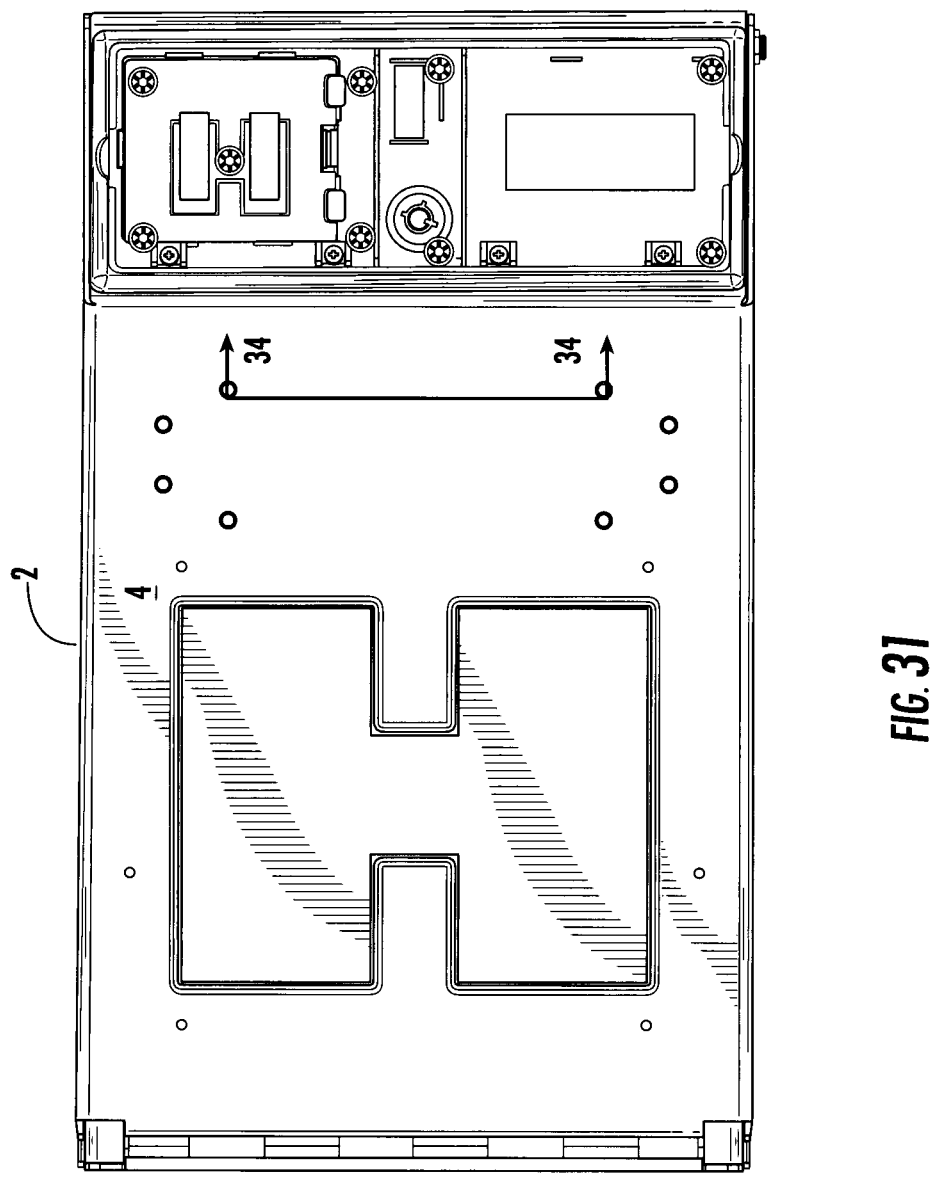
FIG. 31 is a top view of the embodiment illustrated in FIG. 1.
Figure 32:
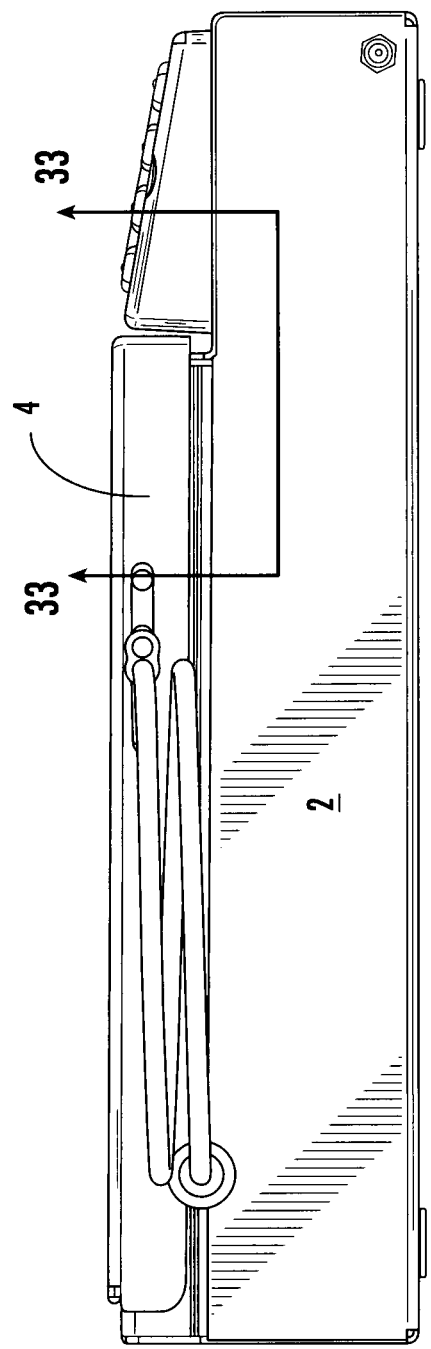
FIG. 32 is a left side view of the embodiment illustrated in FIG. 31.

Referring to FIGS. 15-19 and 27-30, operation of the latch assembly in an open position with the lid closed and ready to spring open is illustrated with the cover members 58, 110 removed for clarity. As shown in FIG. 11, the release mechanism is shown in a second position whereby the release lever 108 and the follower pin 118 are positioned near the second end of the guide slot 120, causing the release pin 126 to move the cam lever 82, rotating the cam member 64. In this position, the lock pins 66 are positioned retracted from under the catch plates 88, releasing the door assembly 4 from a closed and locked position. As shown in FIG. 18, the cam member 64 is rotated, causing the reset pin 86 to extend into the first width 90 of the cam slot 74. As illustrated in FIGS. 27-30, the reset pin 86 is extended through the cam member 64, preventing the cam member from rotating back to the locked position and allowing the gas springs 50 to pop the door assembly 4 open. This also allows the door assembly to be easily closed by holding the lock pins 66 in a substantially open position until the door assembly 4 and thus the lock pins 66 are beyond the catch plates 88.

Referring to FIGS. 21-25, operation of the latching assembly upon closing the door assembly is illustrated. In this position, the reset pin 86 is positioned within the first width of the reset slot 84 holding the lock pins 66 in an open position. This is maintained until the reset button 94 contacts the release arm cover 110 causing the reset button to push the rest pin through the reset slot 84 allowing the cam member 64 to rotate as a result of the bias provided by the spring 78. The reset button 94 includes an extension member 130 that is sized to pass through the second width 92 of the reset slot during rotation of the cam member 64. This construction allows the reset button 94 to push the reset pin 86 away from the cam member during rotation thereof for unencumbered movement of the cam member 64.

Referring to FIGS. 31-35, operation of the mini-vault 100 if closed and during a power failure is illustrated. In this condition the bypass lock 26 is utilized to operate the latch assembly 54 without operation of the release assembly 18. The control panel is released from the mini-vault 100 exposing the release lock 26 which is preferably a barrel type tumbler. Rotation of the key causes a lock bar 132 to sweep through a predetermined path which moves the cam lever 82 to the release position allowing the gas springs 50 to open the door assembly. Thereafter restoration of power will allow the mini-vault 100 to function normally.

Figure 60:
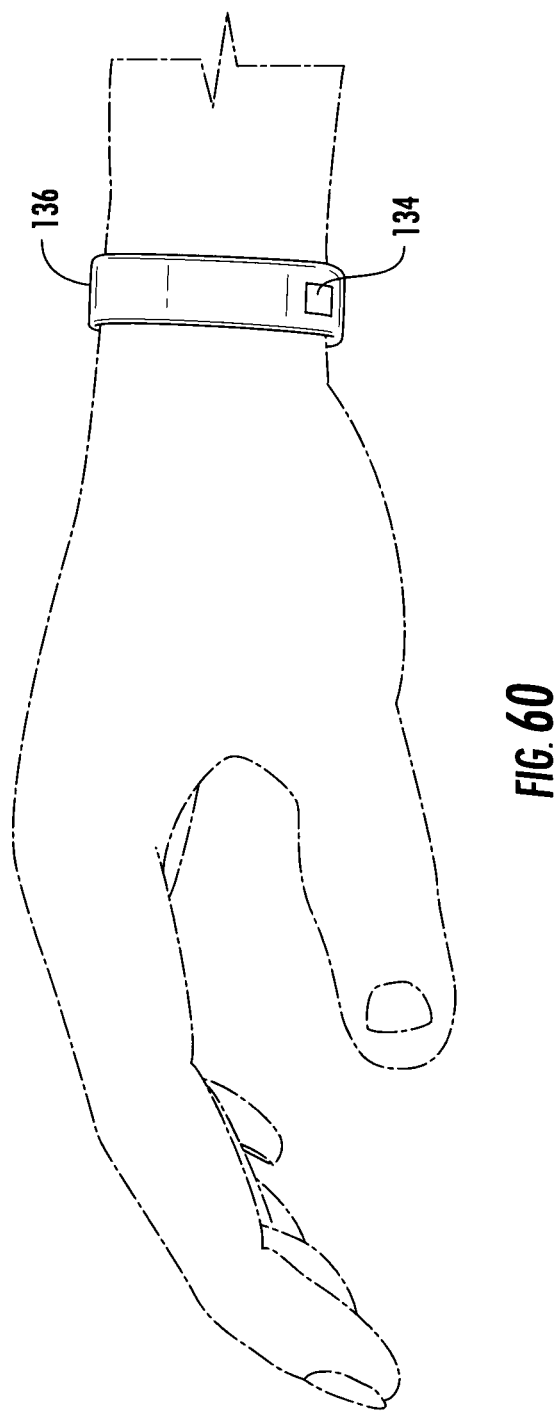
FIG. 60 illustrates an RFID chip embedded into a wrist band for operation of the present invention.

Referring to FIGS. 60-62, various devices which could have Radio Frequency Identification Chip (RFID) 134 embedded into them for operation of the current device are illustrated. The preferred embodiment utilizes a wrist band 136 which includes a RFID chip 134 that is keyed to the mini-vault for operation thereof. Like the wrist band 136, the credit card 138 and the key fob 140 also include RFID chips 134 that are suitable for operation of the mini-vault. In this manner the "key" to the mini-vault can be disguised as many different objects that can be easily hidden in plain sight from thieves and burglars. This construction also provides the victim of a burglary the opportunity to reach his handgun in the presence of the criminal without raising suspicion of the criminal.

Those skilled in the art will recognize that modifications and variations may be made without departing from the true scope and spirit of the invention. Some of these potential variations from the preferred embodiment have been identified above. The invention, therefore, is not to be limited to the embodiments described and illustrated, but is to be determined from the appended claims.

What is claimed is:

1. A firearm storage device comprising:
   a box assembly having a plurality of side walls and an opening to a hollow inner cavity sized to contain a firearm, said side walls secured together along the edges thereof to form a secure assembly;

a door assembly sized and shaped to cover said opening, said door assembly hingedly connected to said box assembly for movement between an open position and a closed position, said open position allowing access to said hollow inner cavity and said closed position preventing access to said hollow inner cavity, a latch assembly for retaining said door assembly in said closed position, said latch assembly including at least one lock pin and a catch member secured within said hollow inner cavity, said lock pin having a locked position in which said lock pin overlaps a portion of said catch member to retain said door assembly in said closed position;

a release assembly positioned within said box assembly, said release assembly including an interrogator for wireless communication with a radio frequency identification device, said release assembly being connected to said lock pin to provide movement to said lock pin so that said lock pin no longer overlaps said catch member in response to communication with said radio frequency identification device releasing said door assembly to said open position, said catch member, lock pin and release assembly automatically reset to a locked position upon closing said door assembly.

2. The firearm storage device of claim 1 wherein said box is parallelepiped in shape having five side walls and one open side.

3. The firearm storage device of claim 1 including at least one spring member positioned to bias said door assembly to said open position, whereby said at least one spring is in a deflected position while said door assembly is in said closed position, said spring causing said door assembly to open automatically upon movement of said lock pin from engagement with said catch member.

4. The firearm storage device of claim 1 wherein said release assembly includes an electric motor for moving said lock pin.

5. The firearm storage device of claim 4 wherein said release assembly includes at least one battery for providing electrical power to said electric motor.

6. The firearm storage device of claim 1 including at least one radio frequency identification device for wireless communication with said release assembly, said radio frequency identification device is a radio frequency identification tag.

7. The firearm storage device of claim 6 wherein said radio frequency identification device is hidden within another object so that it is not readily identifiable.

8. The firearm storage device of claim 7 wherein said radio frequency identification device is hidden within a wristband.

9. The firearm storage device of claim 1 including at least one spring member positioned to bias said door assembly to said open position, whereby said at least one spring is in a deflected position while said door assembly is in said closed position, said spring deflection providing a force causing said door assembly to pop open automatically upon release of said latch assembly.

10. A firearm storage device comprising:
a box assembly having a plurality of side walls and an opening to a hollow inner cavity sized to contain a firearm, said side walls secured together along the edges thereof to form a secure assembly;

a door assembly sized and shaped to cover said opening, said door assembly hingedly connected to said box assembly for movement between an open position and a closed position, said open position allowing access to said hollow inner cavity and said closed position preventing access to said hollow inner cavity, a latch assembly for retaining said door assembly in said closed position, said latch assembly including at least one lock pin and a catch member, said lock pin and said catch member secured within said inner cavity of said firearm storage device for retaining said door assembly in said closed position, said lock pin having a locked position in which said lock pin overlaps a portion of said catch member to retain said door assembly in said closed position;

a release assembly positioned within said box assembly, said release assembly including an interrogator for wireless communication with a radio frequency identification device, said release assembly being constructed and arranged to provide movement of said lock pin so that said lock pin no longer overlaps said catch member in response to communication with said radio frequency identification device releasing said door assembly to said open position, said release assembly resetting to a locked position upon closure of said door assembly.

11. The firearm storage device of claim 10 wherein said release assembly includes an electric motor for moving said lock pin.

12. The firearm storage device of claim 10 wherein said release assembly includes at least one battery for providing electrical power to said interrogator.

13. The firearm storage device of claim 10 wherein said box assembly includes a power inlet jack, said power inlet jack including a power cord constructed and arranged for electrical communication with a power outlet, said power inlet jack in electrical communication with said release assembly for operation thereof.

14. The firearm storage device of claim 10 wherein said at least one radio frequency identification device for wireless communication with said release assembly is a passive radio frequency identification device.

15. The firearm storage device of claim 14 including at least one spring member positioned to bias said door assembly to said open position.

16. A firearm storage device comprising:
a box assembly having a plurality of closed sides and one open side forming a cavity sized to contain at least one firearm therein, a door assembly sized and shaped to cover said open side, said door assembly connected to said box assembly for movement between an open position and a closed position, said open position allowing access to said cavity and said closed position preventing access to said cavity, a latch assembly for retaining said door assembly in said closed position, said latch assembly having at least one movable member that overlaps a portion of said box assembly and said door assembly to maintain said closed position, a release assembly positioned within said firearm storage device, said release assembly including an interrogator for wireless communication with a radio frequency identification device, said release assembly being constructed and arranged to move said moveable member so that said moveable member no longer overlaps both said portion of said box assembly and said door assembly in response to communication with said radio frequency identification device releasing said door assembly to said open position, said latch assembly resetting to a latched and locked position upon closure of said door assembly.

* * * * *